(12) United States Patent
Bang et al.

(10) Patent No.: US 7,451,633 B2
(45) Date of Patent: Nov. 18, 2008

(54) APPARATUS AND METHOD FOR CORRECTING INERTIAL SENSOR AND RECORDING MEDIUM RECORDING THE METHOD

(75) Inventors: Won-chul Bang, Seongnam-si (KR); Dong-yoon Kim, Seoul (KR); Jong-koo Oh, Suwon-si (KR); Sung-jung Cho, Suwon-si (KR); Joon-kee Cho, Yongin-si (KR); Eun-seok Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 11/353,988

(22) Filed: Feb. 15, 2006

(65) Prior Publication Data

US 2006/0179915 A1     Aug. 17, 2006

(30) Foreign Application Priority Data

Feb. 15, 2005    (KR)  ...................... 10-2005-0012356

(51) Int. Cl.
*G01P 21/00*     (2006.01)
(52) U.S. Cl. ...................................................... 73/1.38
(58) Field of Classification Search .................... None
See application file for complete search history.

(56) References Cited

U.S. PATENT DOCUMENTS 5,282,044 A * 1/1994 Misawa et al. ........... 348/208.5

* cited by examiner

*Primary Examiner*—Robert R Raevis
(74) *Attorney, Agent, or Firm*—Sughrue Mion, PLLC

(57) ABSTRACT

An apparatus for correcting an inertial sensor includes an inertial sensor module, a storage module and a control module. The inertial sensor module measures angular velocity and acceleration of an object moving in a space. The storage module stores predetermined operation information and parameters required to correct the measured acceleration. The control module calculates motion velocity from the measured acceleration using the operation information and the parameters, and corrects the calculated motion velocity for each interval between zero-angular-velocity time instances at which angular velocity about an arbitrary axis is "0".

16 Claims, 20 Drawing Sheets

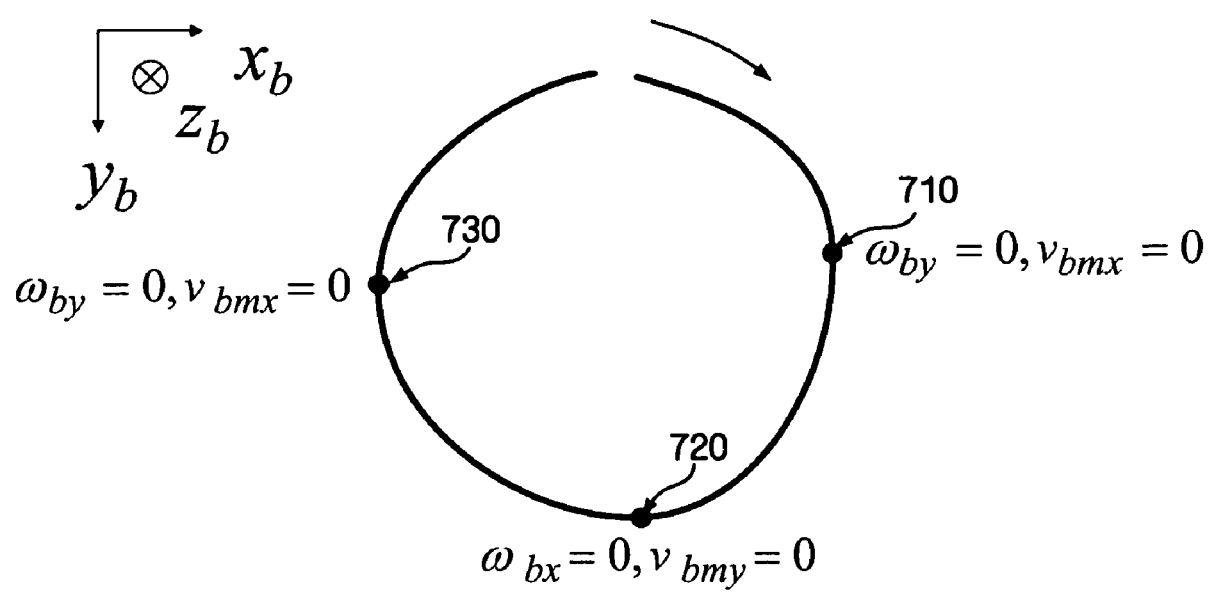

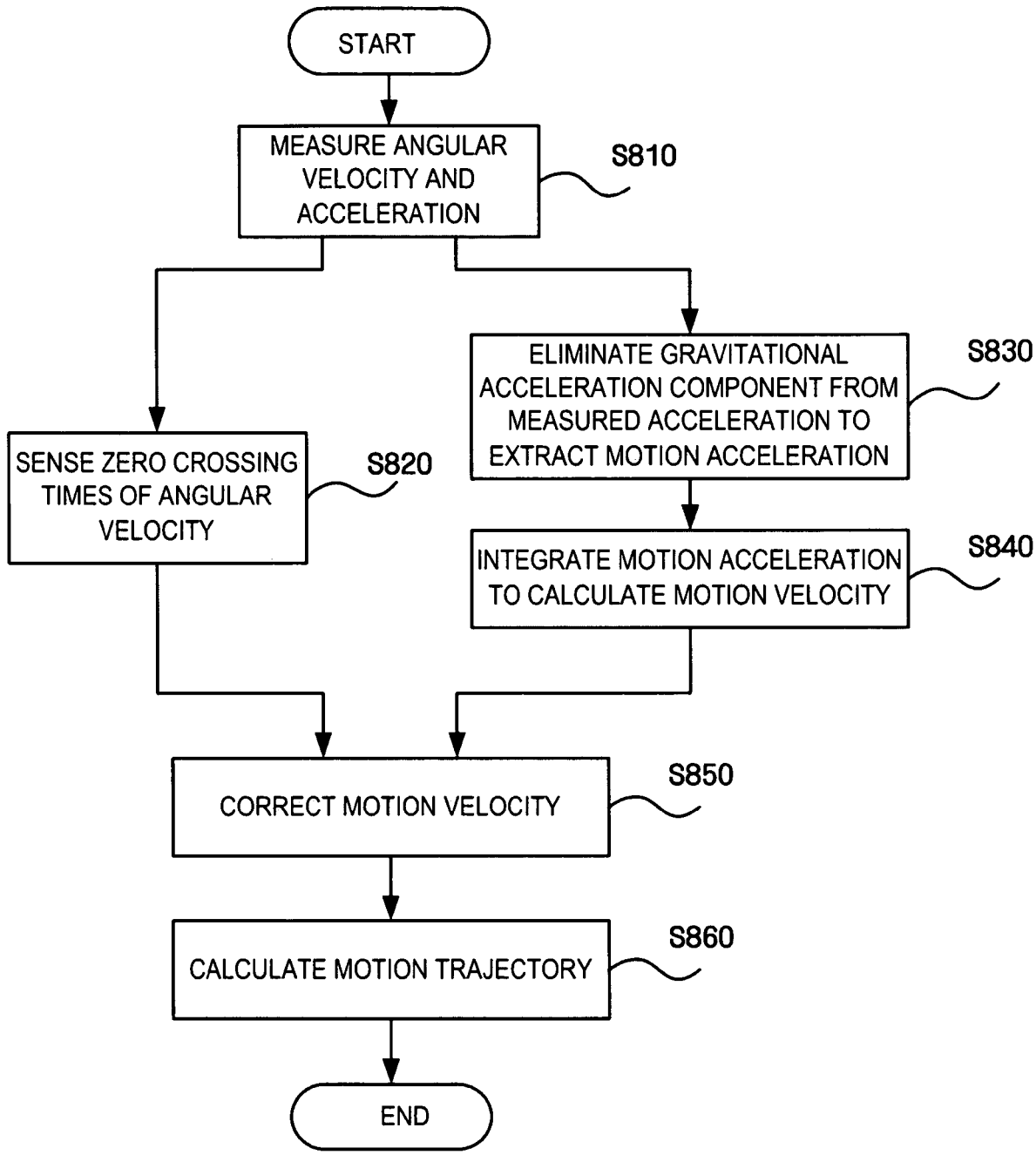

MEASURED ACCELERATION

MOTION ACCELERATION

GRAVITATIONAL ACCELERATION

APPARATUS AND METHOD FOR CORRECTING INERTIAL SENSOR AND RECORDING MEDIUM RECORDING THE METHOD

CROSS-REFERENCE TO RELATED APPLICATION

This application is based on and claims priority from Korean Patent Application No. 10-2005-0012356 filed on Feb. 15, 2005, in the Korean Intellectual Property Office, the disclosure of which is incorporated herein by reference in its entirety.

BACKGROUND OF THE INVENTION

1. Field of the Invention

Apparatuses and methods consistent with the present invention relate to correcting an inertial sensor.

2. Description of the Related Art

Generally, an inertial sensor denotes an acceleration sensor for measuring acceleration to calculate variation in the position of an object, and an angular velocity sensor, called a "gyroscope", for measuring angular velocity to calculate variation in an angle of rotation of an object.

However, such an acceleration sensor is disadvantageous in that inherent error therein accumulates upon integration of measured acceleration with respect to time, thus causing a large difference between a calculated position and an actual position.

For example, the offset of the acceleration sensor is equal to the output of the acceleration sensor when no acceleration is applied, which should ideally be "0". However, such an offset causes a slight error due to physical limitations in implementing the acceleration sensor, and may slightly change over time or with changing temperature. Such a slowly changing offset value of the acceleration sensor is called drift.

The drift of acceleration offset also exerts an influence when acceleration is applied, so that it is difficult to classify the output of the acceleration sensor into a part of the output caused by drift and a part of the output caused by applied acceleration.

FIGS. 1A to 1G are graphs showing motion trajectory when the above-described drift does not exist. FIG. 1A illustrates motion trajectory in which a rectangular path is formed counterclockwise in X-Y coordinates in a space.

FIGS. 1B and 1C illustrate graphs of position variation versus time with respect to x and y axes, respectively. FIGS. 1D and 1E illustrate graphs of velocity variation versus time with respect to x and y axes, respectively. FIGS. 1F and 1G illustrate graphs of acceleration variation versus time with respect to x and y axes, respectively.

FIGS. 2A to 2G are graphs showing motion trajectory when the above-described drift exists. FIG. 2A illustrates motion trajectory in which a rectangular path is formed clockwise in X-Y coordinates in a space.

FIGS. 2B and 2C illustrate graphs of position variation versus time with respect to x and y axes, respectively. FIGS. 2D and 2E illustrate graphs of velocity variation versus time with respect to x and y axes, respectively. FIGS. 2F and 2G illustrate graphs of acceleration variation versus time with respect to x and y axes, respectively. In this case, drift is assumed to be 0.01 m/sec$^2$ $$\left( \cong \frac{1}{1000} G \right).$$

It can be seen that, when the graphs of FIGS. 1F and 1G are compared to the graphs of FIGS. 2F and 2G, a large difference does not exist therebetween. However, when the graphs of FIGS. 1D and 1E, which represent the graphs of FIGS. 1F and 1G integrated once, are compared to the graphs of FIGS. 2D and 2E, which represent the graphs of FIGS. 2F and 2G integrated once, a slight difference exists in an interval between one and two seconds with respect to the x axis and in an interval between two and three seconds with respect to the y axis. However, it can be seen that, when the graphs of FIGS. 1B and 1C, which represent the graphs of FIGS. 1D and 1E integrated once, are compared to the graphs of FIGS. 2B and 2C, which represent the graphs of FIGS. 2D and 2E integrated once, a greater difference exists. That is, it can be seen that, since drift exists, a large error is caused if integration is performed twice to obtain a position from acceleration.

FIG. 3A is a graph showing the comparison of other motion trajectories when drift exists and does not exist, which shows, for example, numeral "2" drawn in a space. There is a large difference between the case where drift exists and the case where drift does not exist. In FIGS. 3B, 3C and 3D, the motion trajectories shown in FIG. 3A are divided into components for x, y and z axes, respectively. The motion trajectories where drift exists are labeled "A" and the motion trajectories where drift does not exist are labeled "B".

As described above, a large error is caused due to factors, such as drift, when motion trajectory is tracked using an inertial sensor.

Therefore, in order to minimize the error, variation in the position of an object is tracked by sensing that the velocity of the moving object is "0" using a predetermined method and correcting the integral value of acceleration to "0" whenever the velocity is "0". This method is shown in FIG. 4A. For example, if the graph of FIG. 4A is assumed to be obtained by integrating acceleration measured by an inertial sensor, the integral value of acceleration at time T is corrected to "0" if the velocity of the moving object is sensed to be "0" at time T using a predetermined method.

As another method, there is a method disclosed in U.S. Pat. No. 6,292,751 (entitled "Positioning Refinement Algorithm"), wherein variation in the position of an object is tracked by sensing that the velocity of the moving object is "0" using a predetermined method, and subtracting a linear expression from the graph of velocity versus an entire time period so as to cause the integral value of acceleration to be "0" whenever velocity is "0". The results of position variation tracking are shown in FIG. 4B. If the velocity of the object is sensed to be "0" at time T, a predetermined linear expression is subtracted from a velocity graph before correction with respect to all time intervals ranging from 0 to T, thus obtaining a velocity graph after correction.

The above methods work by correcting velocity or acceleration using information indicating that velocity is "0". When velocity is "0", motion does not occur in the direction of any axis. That is, the above methods are disadvantageous in that, since correction is performed only when velocity is "0" with respect to all axes, a large error may still accumulate.

Further, the above methods are problematic in that motion trajectory cannot be tracked for a period during which two or more characters are written. For example, when seven characters spelling "Leading" are written in cursive using the method disclosed in U.S. Pat. No. 6,292,751, motion trajectory is tracked in a form shown in FIG. 5. Although the time required for the writing is short, i.e., merely about 4.8 seconds, the characters spelling 'Leading' are not recognizable because of accumulated errors, as deduced from FIG. 5

Therefore, a correction method of minimizing error in an inertial sensor, without sensing the time at which the velocity of a moving object is "0" with respect to all axes, is required.

SUMMARY OF THE INVENTION

The present invention provides a method of correcting acceleration by sensing the time at which angular velocity about an arbitrary axis is "0" using an inertial sensor.

According to an aspect of the present invention, there is provided an apparatus for correcting an inertial sensor, comprising an inertial sensor module for measuring angular velocity and acceleration of an object moving in a space, a storage module for storing predetermined operation information and parameters required to correct the measured acceleration, and a control module for calculating motion velocity from the measured acceleration using the operation information and the parameters, and correcting the calculated motion velocity for each interval between zero-angular-velocity time instances of the measured angular velocity, at which angular velocity about an arbitrary axis is "0".

According to another aspect of the present invention, there is provided a method of correcting an inertial sensor, comprising measuring angular velocity and acceleration of a moving object, extracting zero-angular-velocity time instances, at which angular velocity about an arbitrary axis is "0", from the measured angular velocity, and calculating motion velocity from the measured acceleration, and correcting the calculated motion velocity for each interval between the zero-angular-velocity time instances.

BRIEF DESCRIPTION OF THE DRAWINGS

The above and other aspects of the present invention will be more clearly understood from the following detailed description of exemplary embodiments of the invention taken in conjunction with the accompanying drawings, in which:

FIG. 7 is a graph showing another example of the basic concept of the implementation of the present invention;

FIG. 8 is a flowchart of a method of correcting an inertial sensor according to an embodiment of the present invention;

DESCRIPTION OF THE EXEMPLARY EMBODIMENTS

Figure 1A:
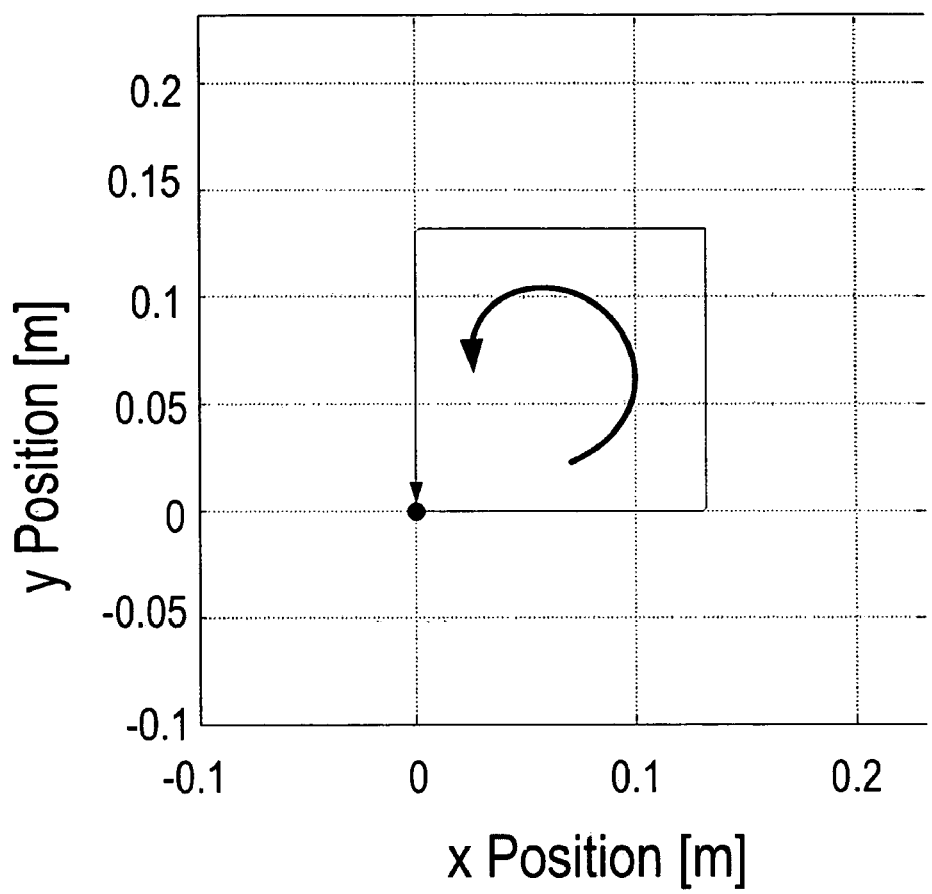
FIGS. 1A to 1G are graphs showing motion trajectory when drift does not exist.
Figure 1B:
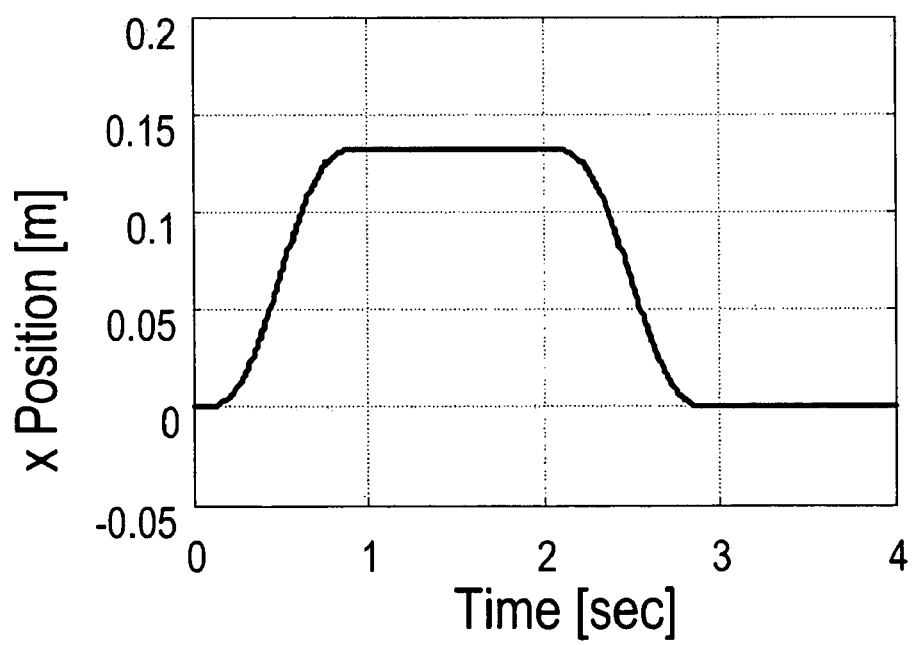
Figure 1C:
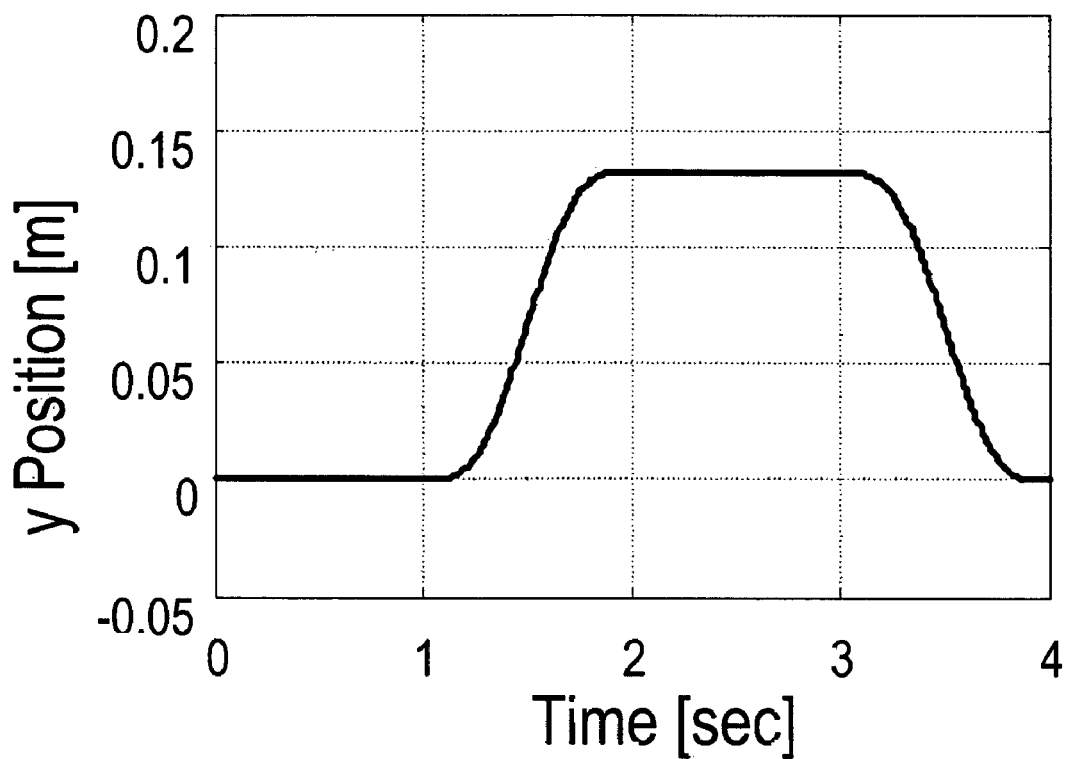
Figure 1D:
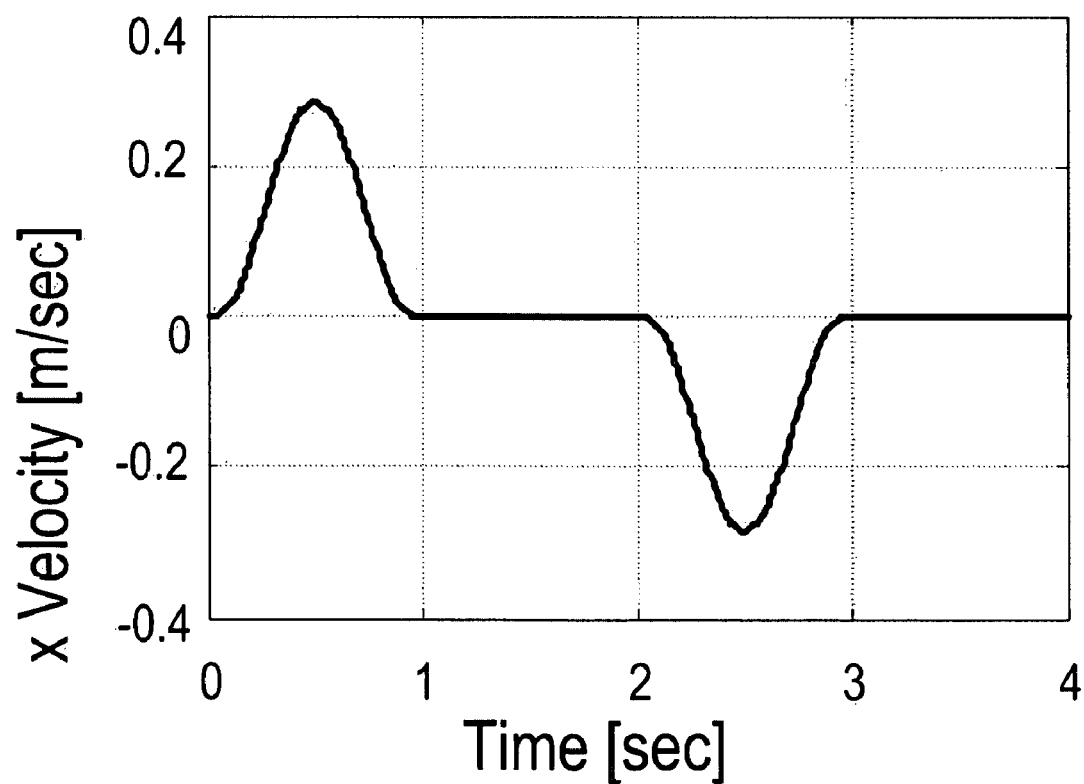
Figure 1E:
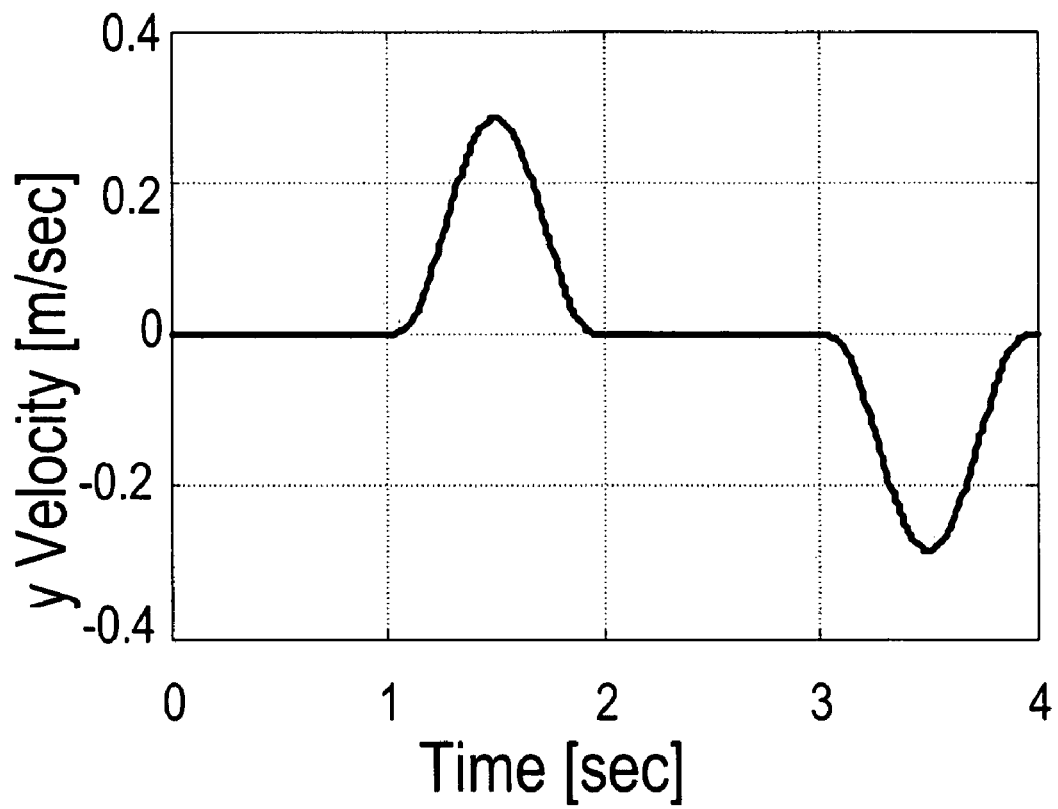
Figure 1F:
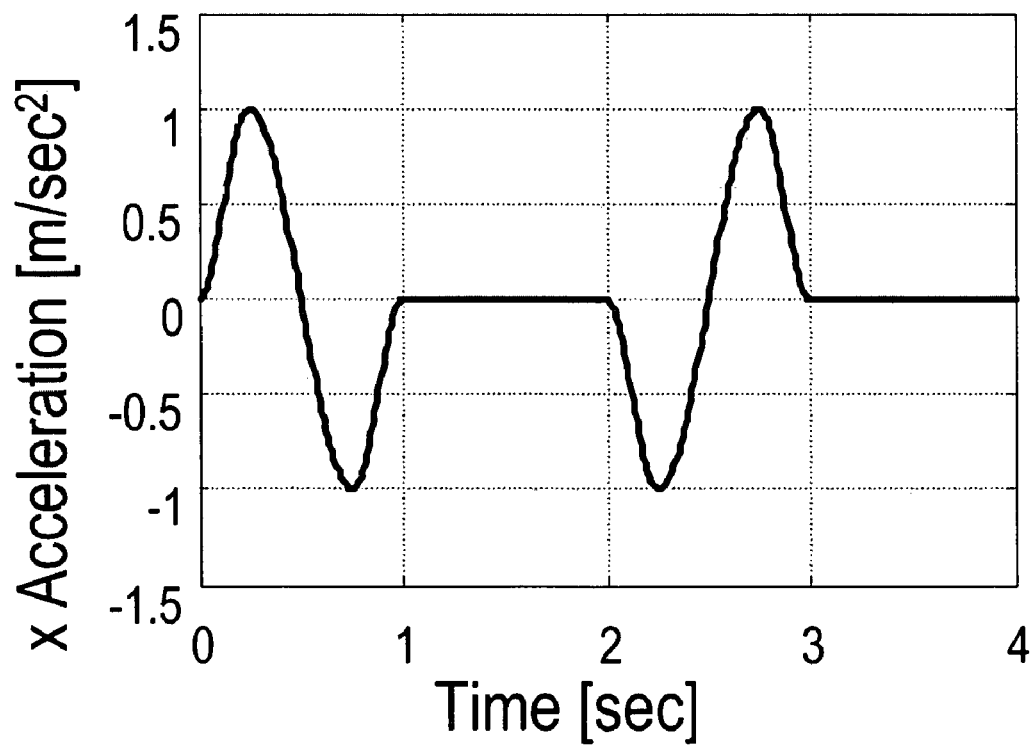
Figure 1G:
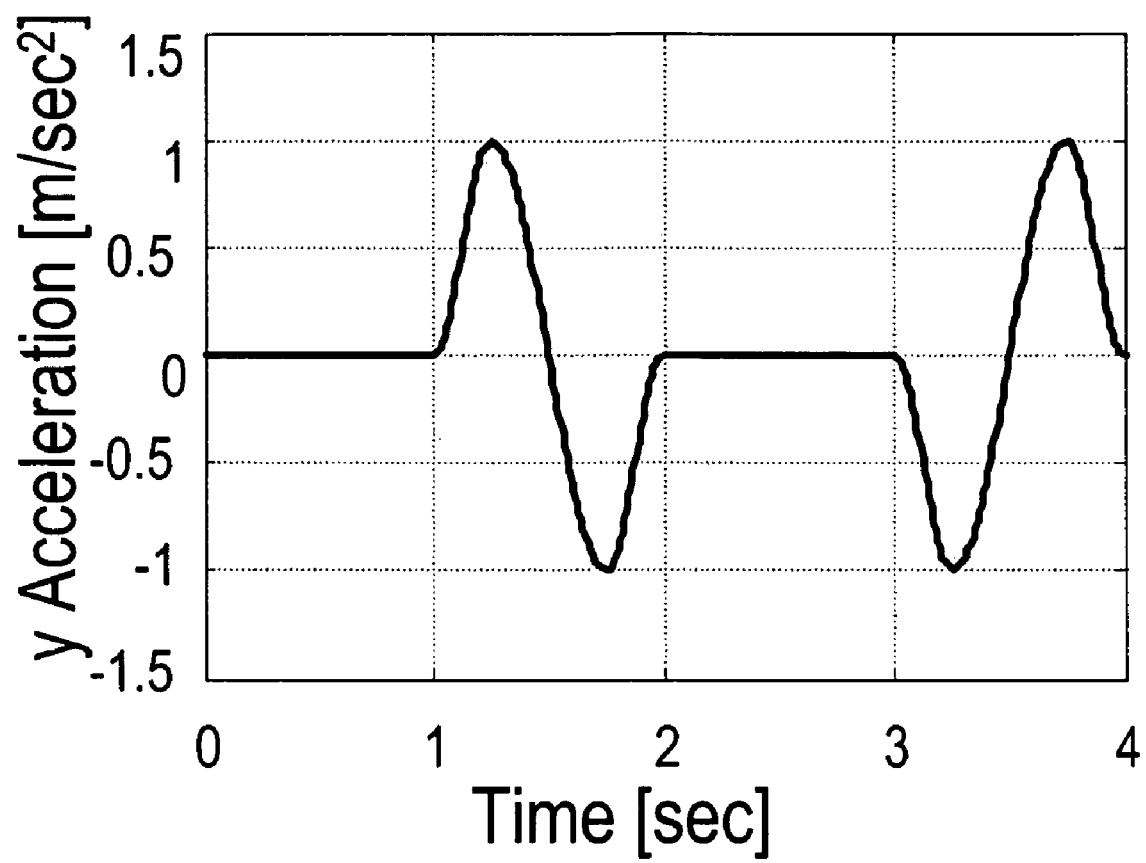
Figure 2A:
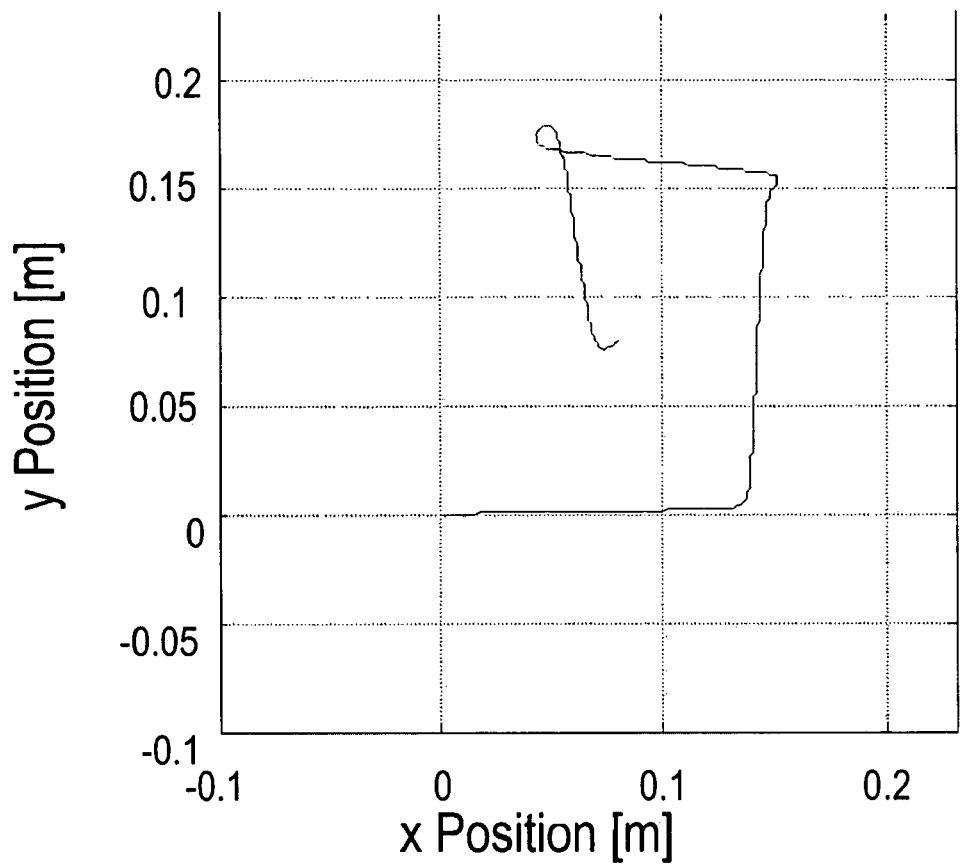
FIGS. 2A to 2G are graphs showing motion trajectory when drift exists.
Figure 2B:
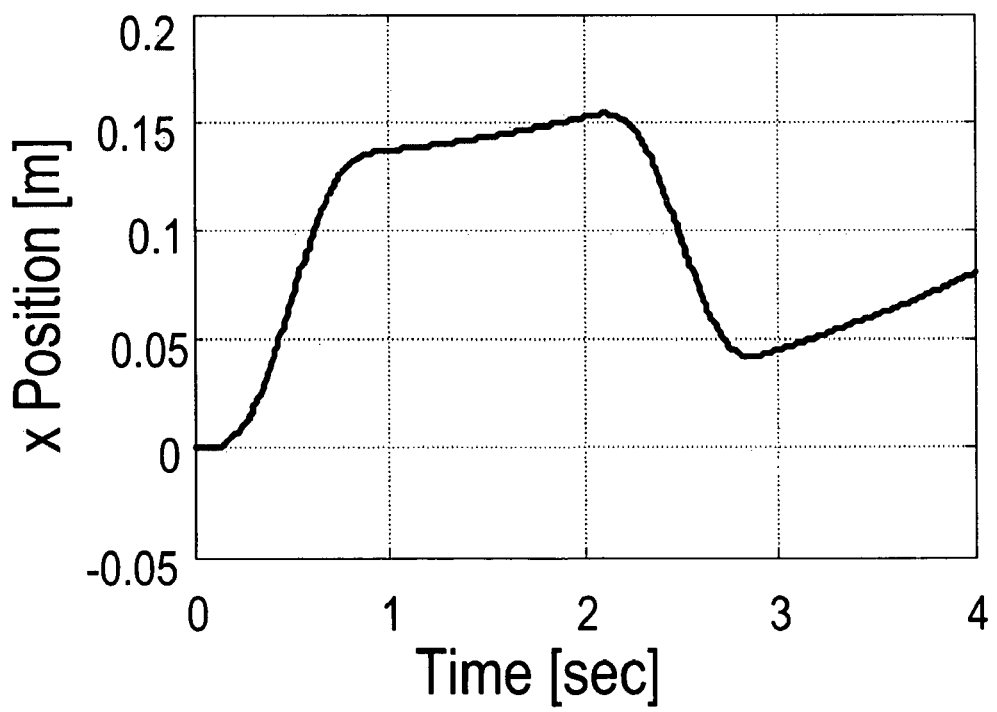
Figure 2C:
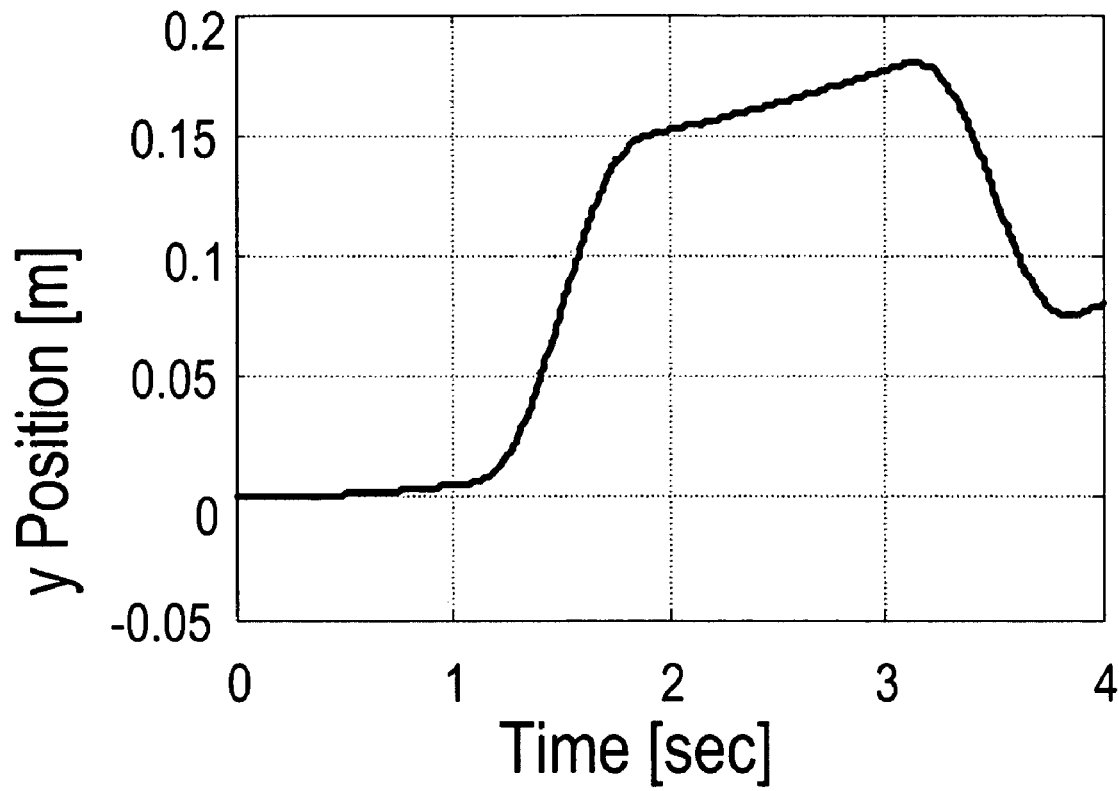
Figure 2D:
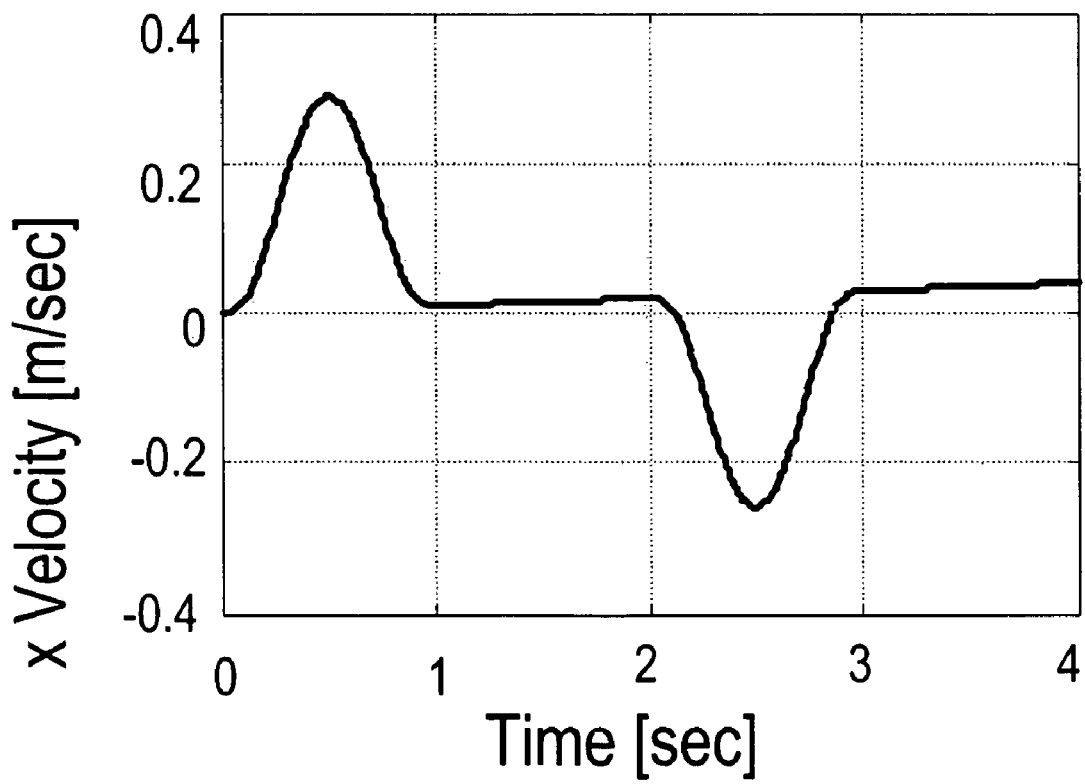
Figure 2E:
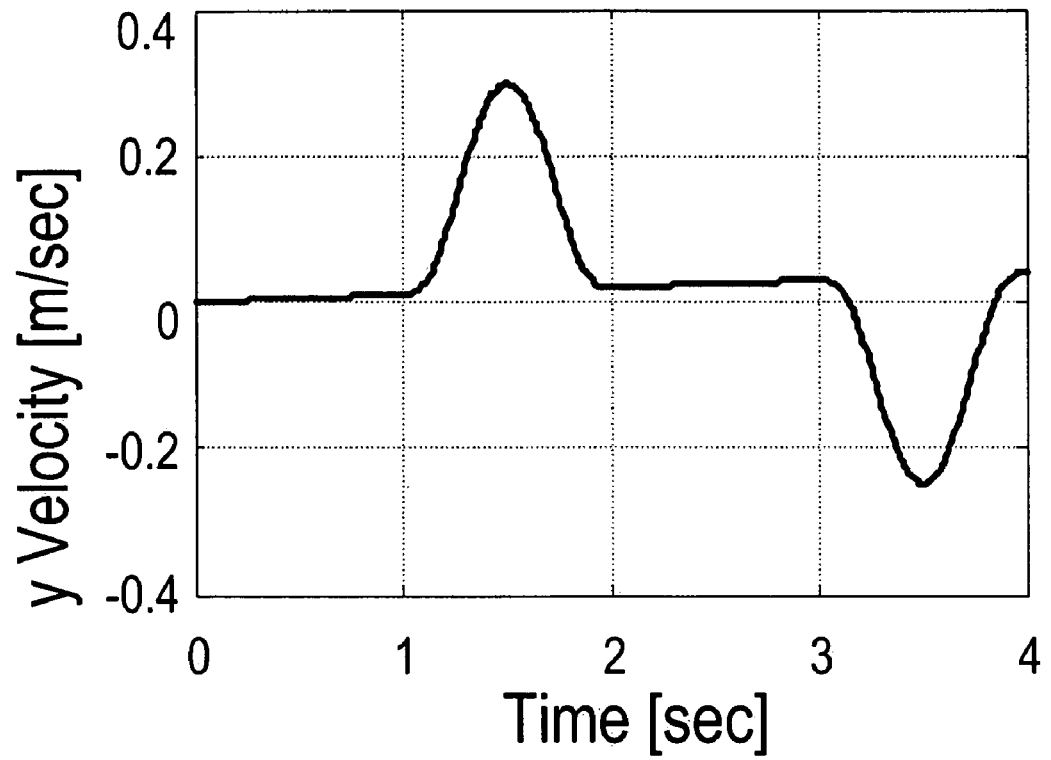
Figure 2F:
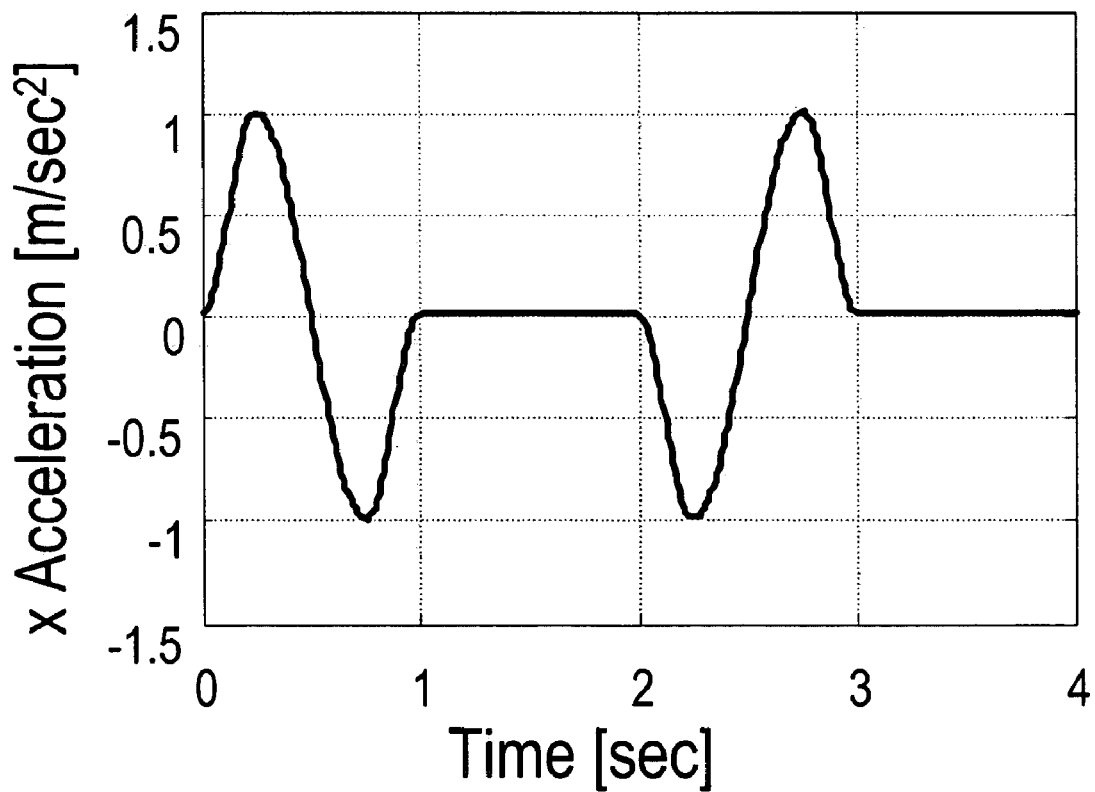
Figure 2G:
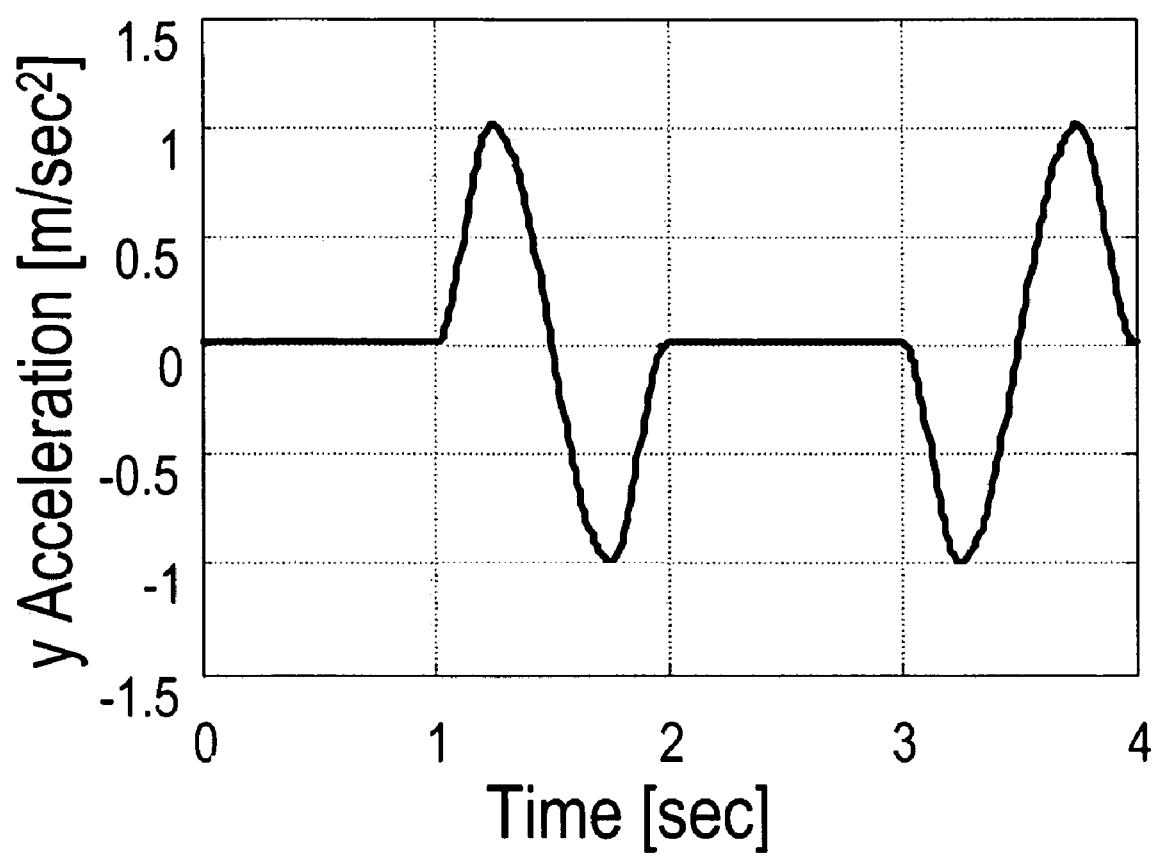
Figure 3A:
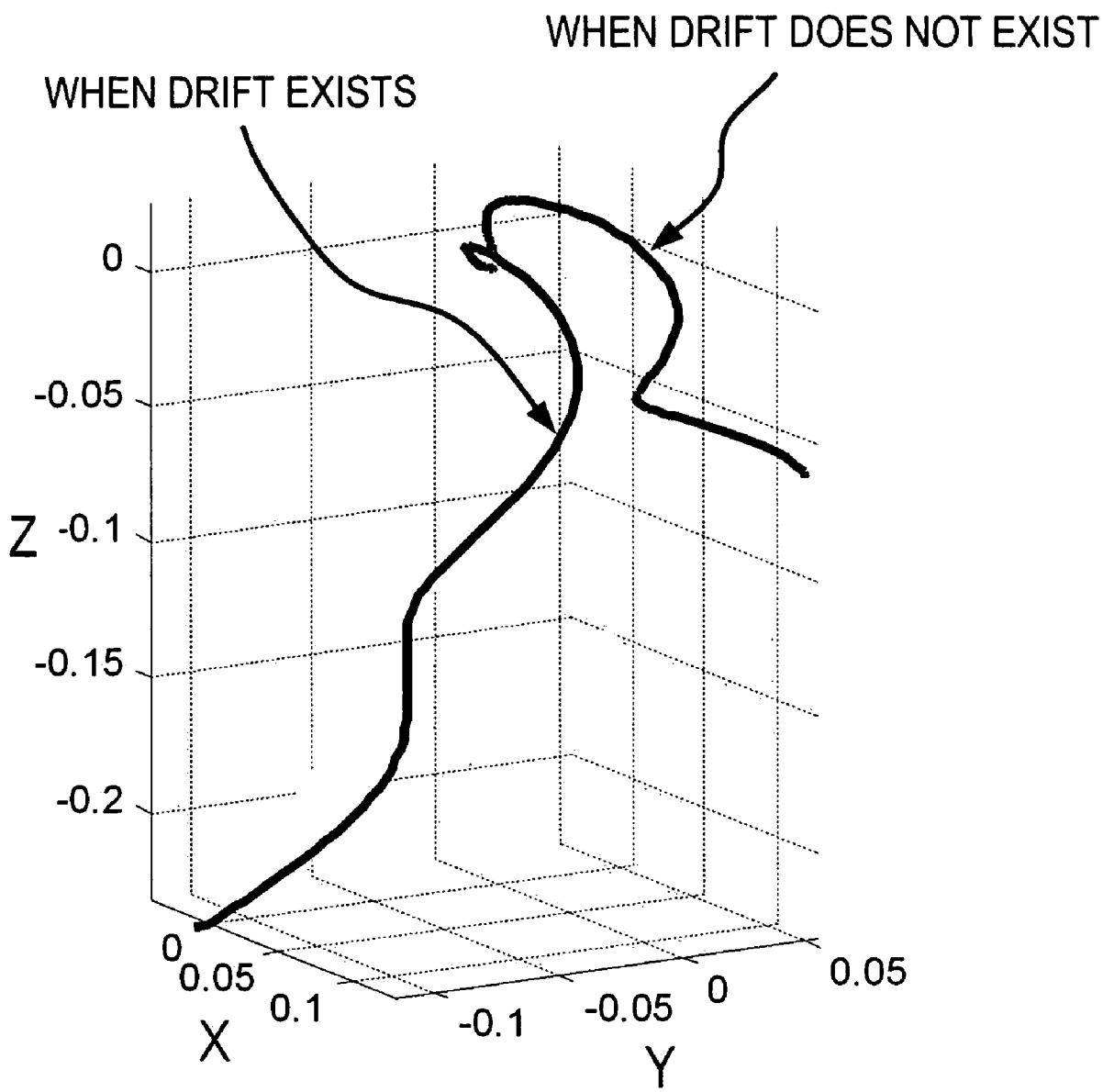
FIGS. 3A to 3D are graphs showing a comparison of motion trajectories when drift exists and does not exist.
Figure 3B:
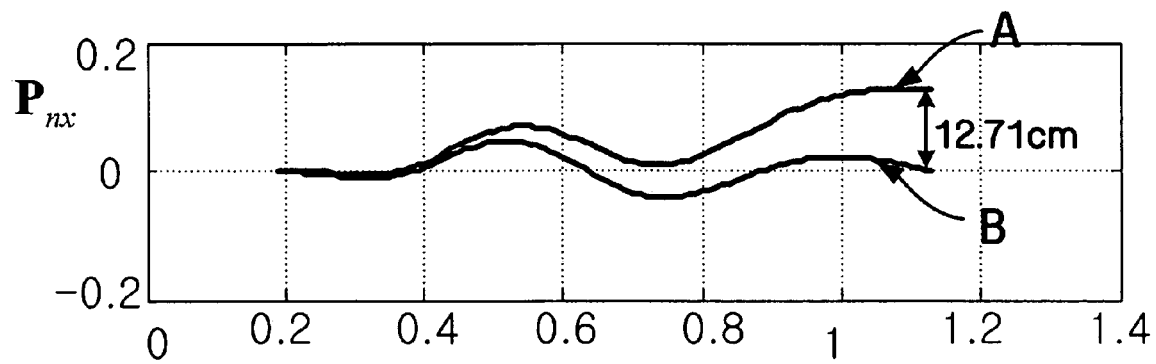
Figure 3C:
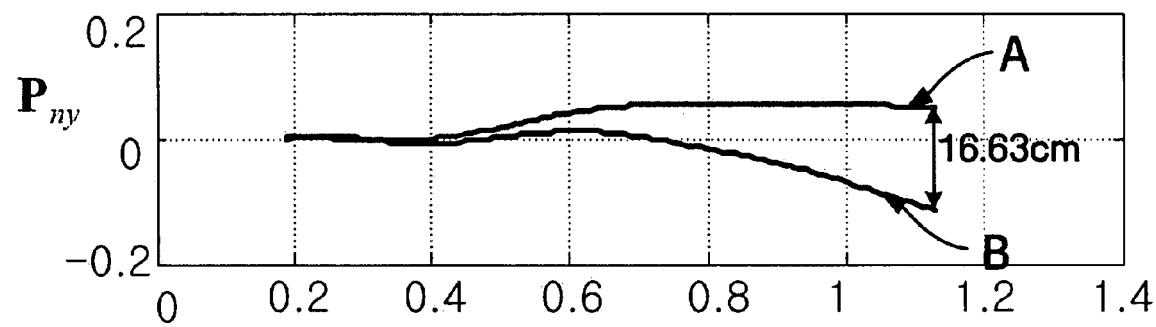
Figure 3D:
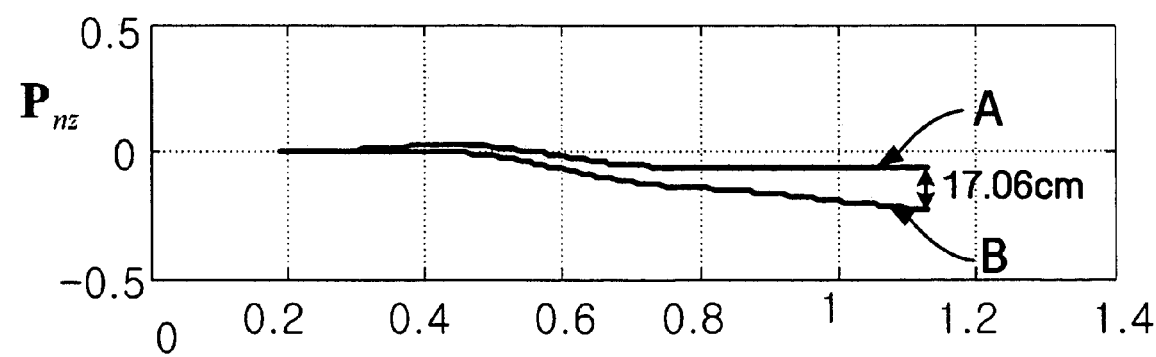
Figure 4A:
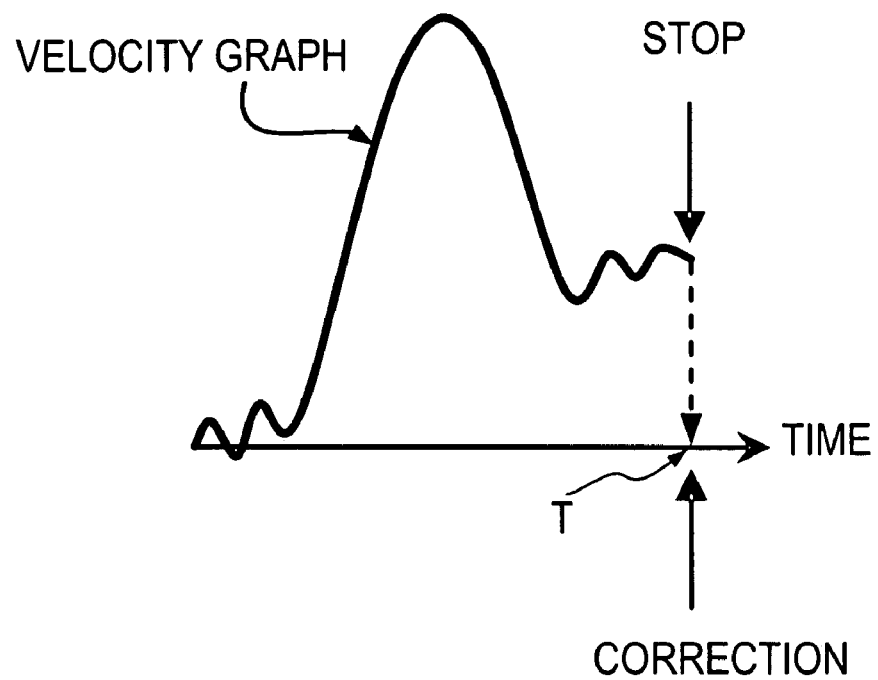
FIG. 4A is a graph showing an example of a conventional method of correcting error occurring at the time of tracking a position using an inertial sensor.
Figure 4B:
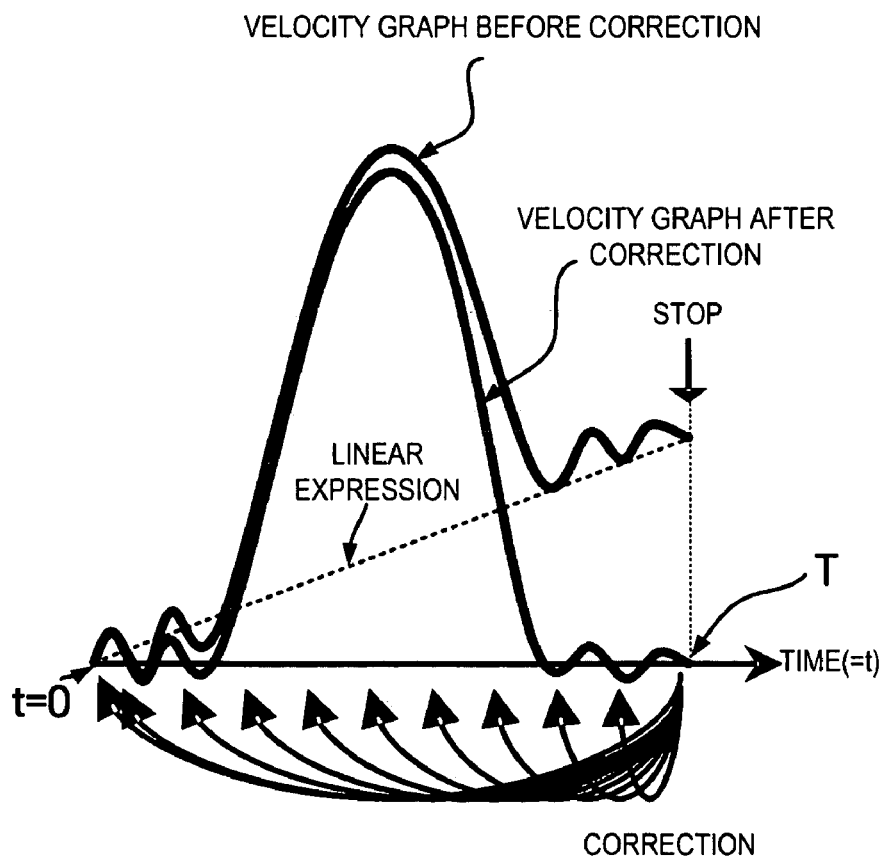
FIG. 4B is a graph showing another example of a conventional method of correcting error occurring at the time of tracking a position using an inertial sensor.
Figure 5:
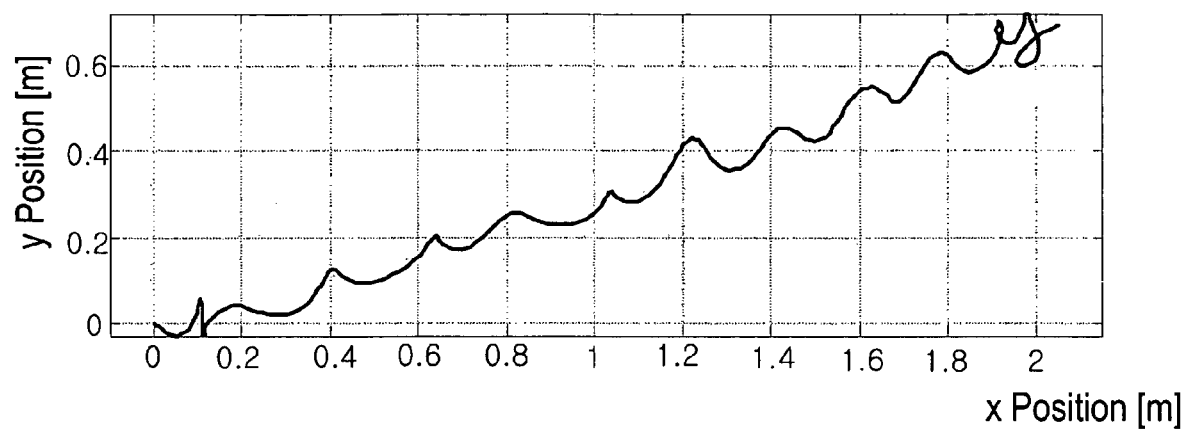
FIG. 5 is a graph showing an example of the results of the tracking of motion trajectory using a conventional method.

Hereinafter, exemplary embodiments of the present invention will be described in detail with reference to the attached drawings.

In the drawings, the same reference numerals are used throughout the different drawings to designate the same or similar components.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operations to be performed on the computer or other programmable apparatus to realize a computer implemented process such that the instructions that are executed on the computer or other programmable apparatus provide operations for implementing the functions specified in the flowchart block or blocks.

In addition, each block of the flowchart illustrations may represent a module, segment, or portion of code, which comprises one or more executable instructions for implementing the specified logical functions. It should also be noted that in some alternative implementations, the functions noted in the blocks may occur out of order. For example, two blocks shown in succession may in fact be executed substantially concurrently, or the blocks may sometimes be executed in reverse order, depending upon the functionality involved.

Figure 6:
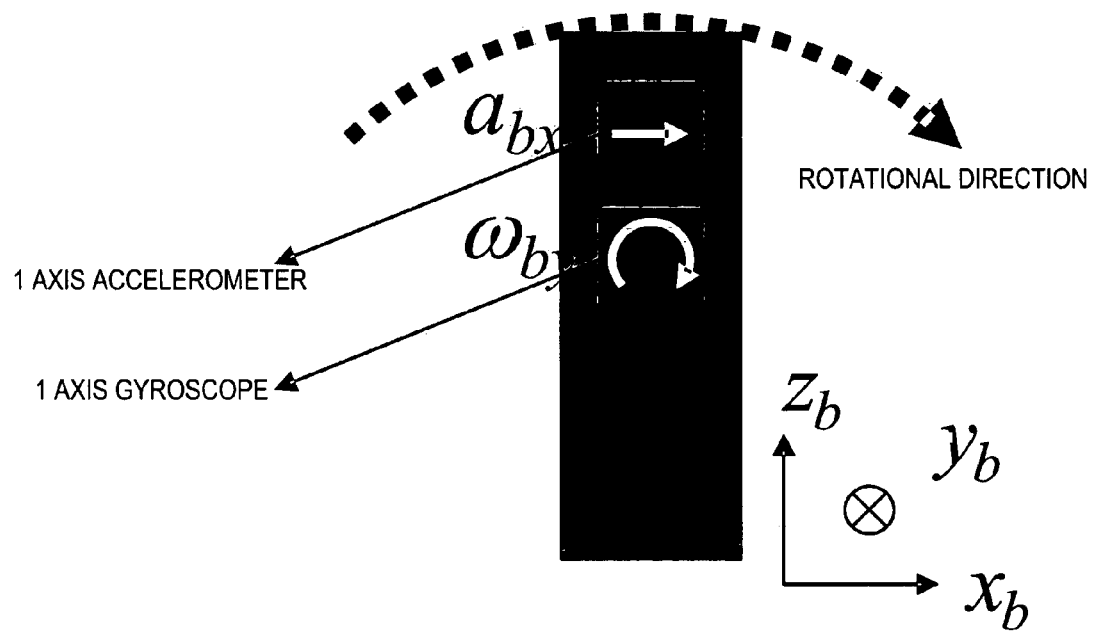
FIG. 6 is a graph showing an example of the basic concept of the implementation of the present invention.

FIG. 6 is a graph showing an example of the basic concept of the implementation of the present invention.

First, if it is assumed that acceleration about an x axis is $\alpha_{bx}(t)$, angular velocity obtained when rotation occurs around a y axis is $\omega_{by}(y)$, and a radius of rotation is r(t), rotational motion in a gravity-free state can be expressed by the following Equation [1].

$$\int \alpha_{bx}(t)dt = v_{bx}(t) = \omega_{by}(t) \times r(t) \quad [1]$$

Therefore, angular velocity is "0" the instant the sign of angular velocity is changed. In this case, velocity is also "0" based on Equation [1]. That is, when the angular velocity sensor of an inertial sensor outputs a value "0", the integral value of the acceleration measured by an acceleration sensor must be "0". In the present invention, the time at which velocity is "0" can be detected by sensing the time at which the angular velocity sensor outputs a value "0" with respect to the arbitrary axis of the inertial sensor.

For example, when a circle is drawn clockwise, as shown in FIG. 7, direction switching occurs at least twice in the direction of the x axis, and at least once in the direction of the y axis. Therefore, at positions 710 and 730, angular velocity about the y axis is "0", so that velocity about the x axis is "0". At position 720, angular velocity about the x axis is "0", so that velocity about the y axis is "0".

FIG. 8 is a flowchart of a method of correcting an inertial sensor according to an exemplary embodiment of the present invention.

First, angular velocity and acceleration are measured by an inertial sensor at operation S810.

In the case of angular velocity, the zero-angular-velocity time instances of the angular velocity about an arbitrary axis are sensed and extracted at operation S820. Zero-angular-velocity time instances may occur when the angular velocity changes from negative to positive and vice versa, or from positive (or negative) to 0 and then to positive (or negative).

In the case of acceleration, a gravitational acceleration component is eliminated from the acceleration, measured at operation S810, to extract motion acceleration at operation S830. The acceleration includes gravitational acceleration caused by the earth's gravity in addition to motion acceleration, therefore there is a need to eliminate the gravitational acceleration.

That is, if it is assumed that motion acceleration in an absolute coordinate system is $A_n$, measured acceleration in a relative coordinate system is $A_b$, and gravitational acceleration in the absolute coordinate system is G, $A_b$ can be expressed by the following Equation [2].

$$A_b = C_n^b A_n + C_n^b G \quad [2]$$

where $(C_n^b)^{-1} = C_b^n$ $$C_b^n = \begin{bmatrix} \theta_c \psi_c & -\phi_c \psi_s + \phi_s \theta_s \psi_c & \phi_s \psi_s + \phi_c \theta_s \psi_c \\ \theta_c \psi_s & \phi_c \psi_c + \phi_s \theta_s \psi_s & -\phi_s \psi_c + \phi_c \theta_s \psi_s \\ -\theta_s & \phi_s \theta_c & \phi_c \theta_c \end{bmatrix}$$

$$\dot{\phi} = \omega_{bx} + (\omega_{by}\sin\phi + \omega_{bz}\cos\phi)\tan\theta$$

$$\dot{\theta} = \omega_{by}\cos\phi + \omega_{bz}\sin\phi$$

$$\dot{\psi} = \frac{\omega_{by}\sin\phi + \omega_{bz}\cos\phi}{\cos\phi}$$

$$G = [0\ 0\ 9.8]^T$$

In this case, $(C_n^b)^{-1} = C_b^n$ is a coordinate transformation matrix for transforming a relative coordinate system into an absolute coordinate system. Further, subscript "b" denotes a relative coordinate system and suffix "n" denotes an absolute coordinate system. Further, $\phi$ denotes a roll angle, $\theta$ denotes a pitch angle, $\psi$ denotes a yaw angle, subscript "s" denotes a sine function and subscript "c" denotes a cosine function. For example, $\phi_c$ denotes $\cos\phi$.

That is, motion acceleration $C_n^b A_n$ in the relative coordinate system, can be obtained by subtracting gravitational acceleration $C_n^b G$ in the relative coordinate system from the measured acceleration $A_b$.

Figure 9A:
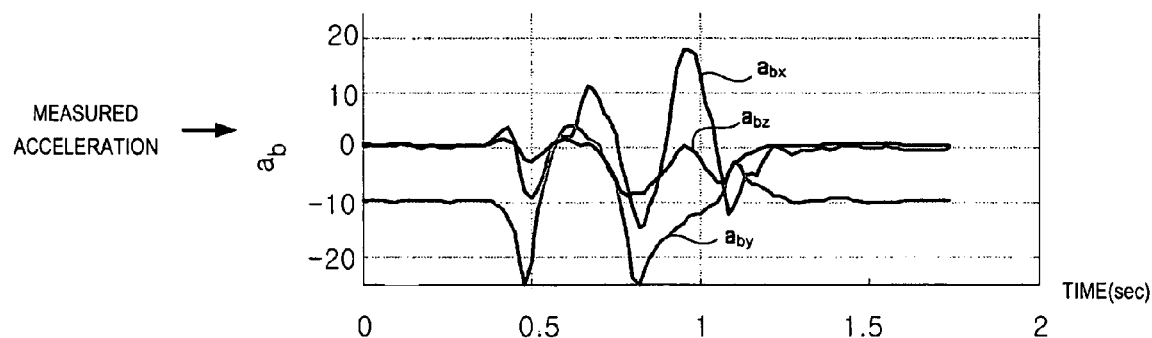
FIGS. 9A, 9B and 9C are graphs showing the components of measured acceleration, motion acceleration extracted from the measured acceleration, and gravitational acceleration extracted from the measured acceleration, respectively, according to the implementation of the present invention.
Figure 9B:
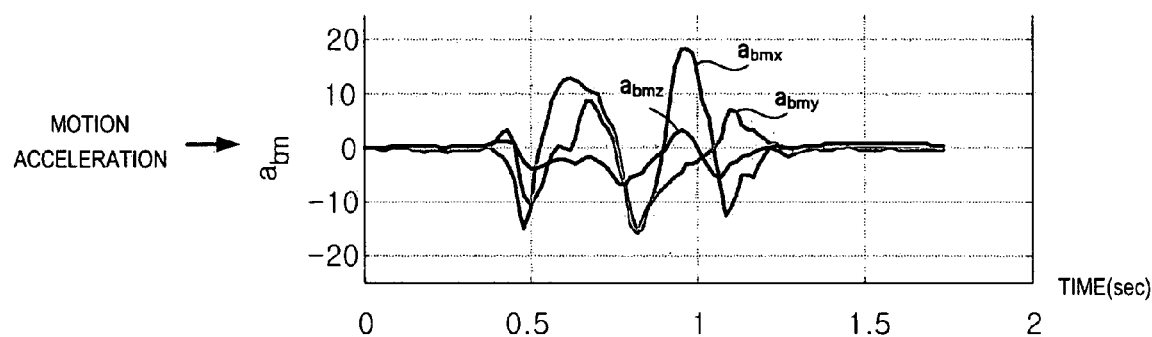
Figure 9C:
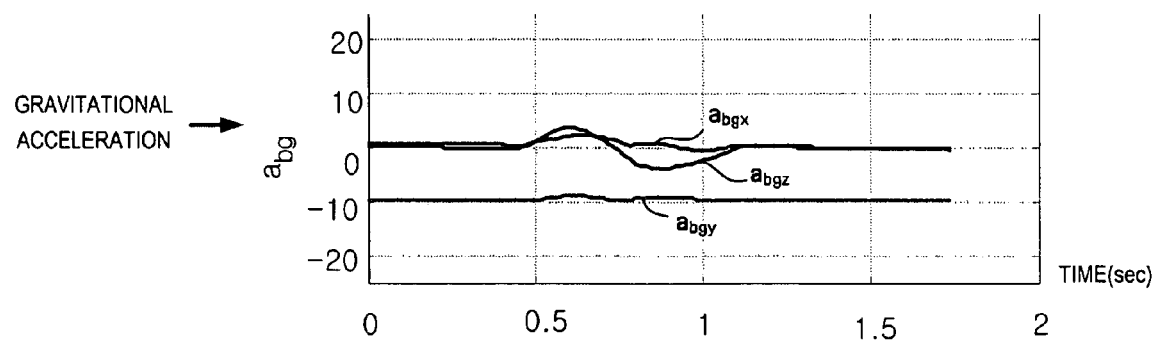

Consequently, at operation S830, motion acceleration in the relative coordinate system can be extracted using Equation [2]. FIGS. 9A, 9B and 9C are graphs showing the components of measured acceleration, motion acceleration extracted from the measured acceleration, and gravitational acceleration extracted from the measured acceleration, respectively.

After the motion acceleration has been extracted from the measured acceleration, the extracted motion acceleration is integrated, thus calculating motion velocity at operation S840.

Figure 10:
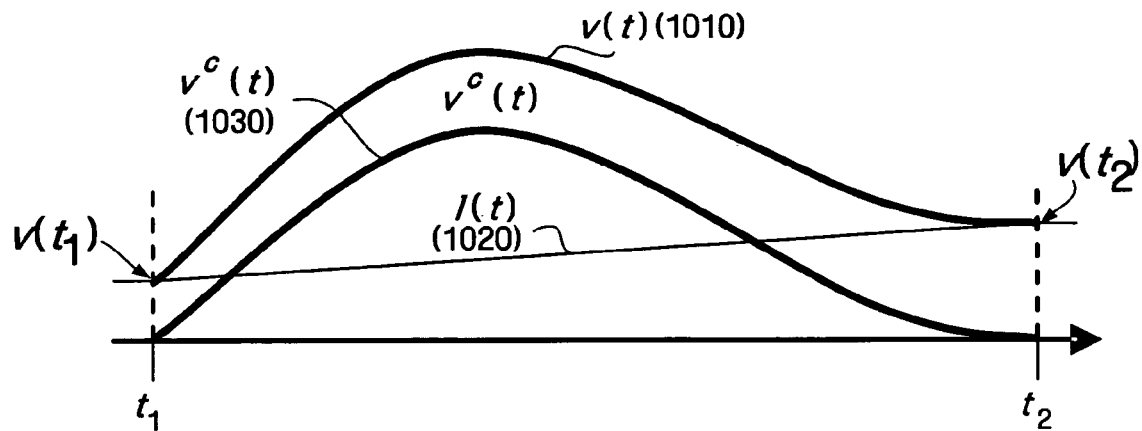
FIG. 10 is a graph showing a method of correcting motion velocity according to the implementation of the present invention.

Thereafter, the calculated motion velocity is corrected using information about the zero-angular-velocity time instances of the angular velocity, sensed at operation S820, at operation S850. FIG. 10 illustrates a method of correcting motion velocity.

In this case, v(t) 1010 denotes motion velocity calculated at operation S840, and $t_1$ and $t_2$ denote the zero-angular-velocity time instances of the angular velocity sensed at operation S820.

Further, a linear expression l(t) 1020 required for correction can be obtained by the following Equation [3].

$$l(t) = \frac{v(t_2) - v(t_1)}{t_2 - t_1} t + \left(v_1 - \frac{v(t_2) - v(t_1)}{t_2 - t_1} t_1\right) \quad [3]$$

Therefore, corrected motion velocity $v^c(t)$ 1030 can be obtained by subtracting the linear expression l(t) 1020, expressed by Equation [3], from the motion velocity v(t) 1010, calculated at operation S840, which is shown in Equation [4].

$$v^c(t) = v(t) - l(t) \quad [4]$$

Figure 11A:
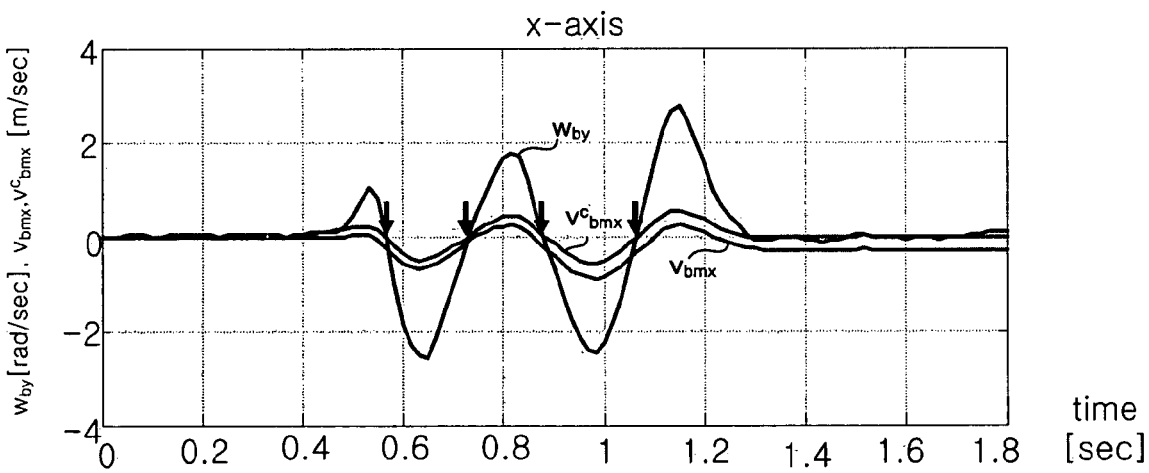
FIGS. 11A and 11B is a graph showing the results of the correction of motion velocity according to the implementation of the present invention.
Figure 11B:
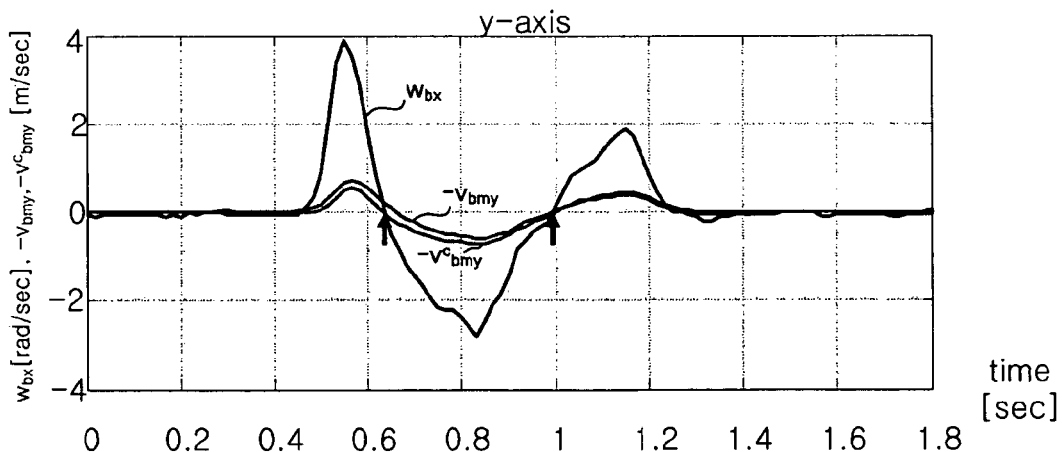

FIGS. 11A and 11B illustrate the results of the correction of motion velocity using the above-described method. In this case, $\omega_{by}$ denotes angular velocity about the y axis measured at operations S810 and S820, $v^c_{bmx}$ denotes motion velocity about the x axis, calculated at operation S840, and $v^c_{bmx}$ denotes motion velocity about the x axis, corrected at operation S850. Further, $\omega_{bx}$ denotes angular velocity about the x axis, measured at operations S810 and S820, $v_{bmy}$ denotes motion velocity about the y axis, calculated at operation S840, and $v^c_{bmy}$ denotes motion velocity about the y axis, corrected at operation S850.

If motion velocity is corrected at operation S850, motion trajectory can be calculated using the corrected motion velocity as an exemplary embodiment at operation S860.

That is, the motion trajectory can be expressed by the double integral of $A_n$, indicating acceleration in the absolute coordinate system, with respect to time. In this case, $A_n$ can be expressed by the following Equation [5].

$$A_n = C_b^n A_b - G \quad [5]$$

-continued where $C_b^n = \begin{bmatrix} \theta_c\psi_c & -\phi_c\psi_s + \phi_s\theta_s\psi_c & \phi_s\psi_s + \phi_c\theta_s\psi_c \\ \theta_c\psi_s & \phi_c\psi_c + \phi_s\theta_s\psi_s & -\phi_s\psi_c + \phi_c\theta_s\psi_s \\ -\theta_s & \phi_s\theta_c & \phi_c\theta_c \end{bmatrix}$ $\dot{\phi} = \omega_{bx} + (\omega_{by}\sin\phi + \omega_{bz}\cos\phi)\tan\theta$ $\dot{\theta} = \omega_{by}\cos\phi - \omega_{bz}\sin\phi$ $\dot{\psi} = \dfrac{\omega_{by}\sin\phi + \omega_{bz}\cos\phi}{\cos\phi}$ $G = [0\ 0\ 9.8]^T$ In this case, $A_b$ denotes corrected acceleration in the relative coordinate system, into which the motion velocity corrected at operation S850 is differentiated once.

Consequently, position $P_n$ in the absolute coordinate system can be expressed by the following Equation [6].

$$P_n(t) = \iint A_n(t)\,dt\,dt \quad [6]$$

Figure 12A:
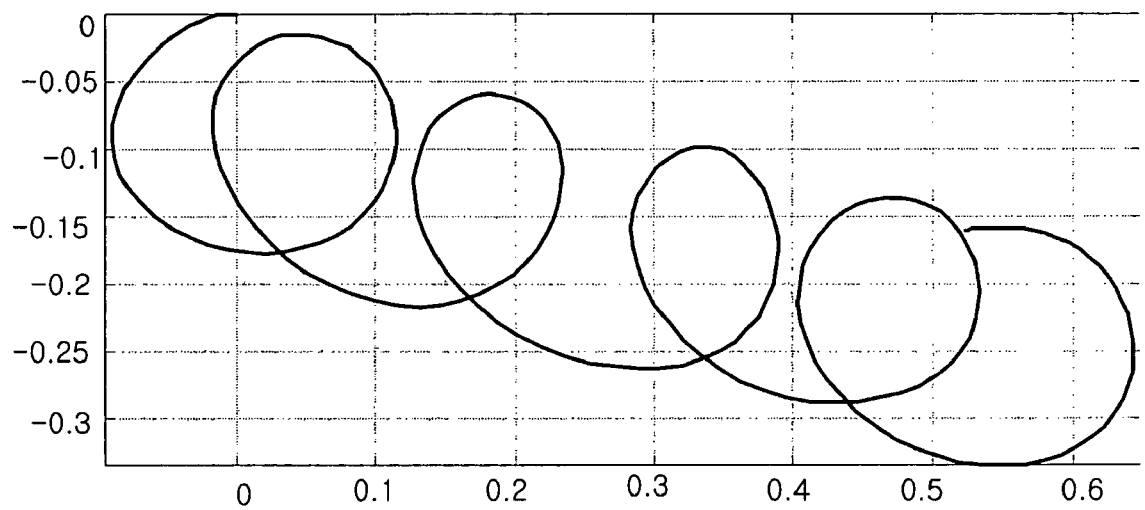
FIGS. 12A and 12B are graphs showing the results of experiments according to the implementation of the present invention.
Figure 12B:
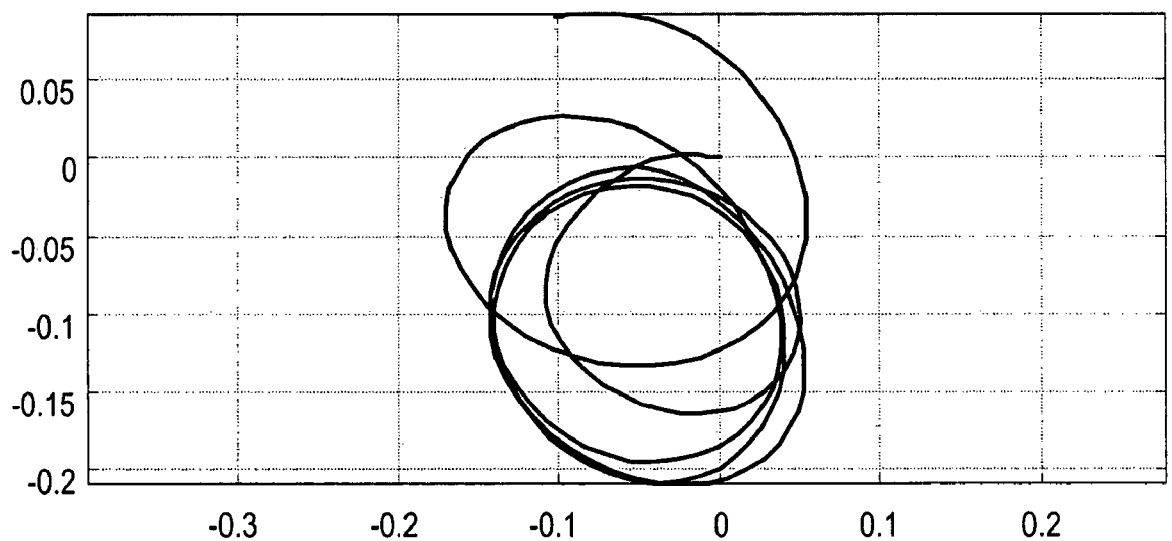

FIGS. 12A and 12B are graphs showing the results of experiments on the tracking of the motion trajectory of an object, executed using the inertial sensor correction method according to the implementation of the present invention. FIG. 12A illustrates the results of experiments based on the conventional method disclosed in U.S. Pat. No. 6,292,751, and FIG. 12B illustrates the results of experiments based on the method of the present invention.

The experiments of FIGS. 12A and FIG. 12B compare the distances between start points and end points with each other when a circle having a diameter of about 20 cm is repeatedly drawn five times for 4.48 seconds. In FIG. 12A, the distance is about 55 cm, while, in FIG. 12B, the distance is about 13 cm. According to the present invention, it can be seen that the error is reduced by about 42 cm. Further, due to the present invention, it can be seen that trajectory is remarkably improved.

Figure 13A:
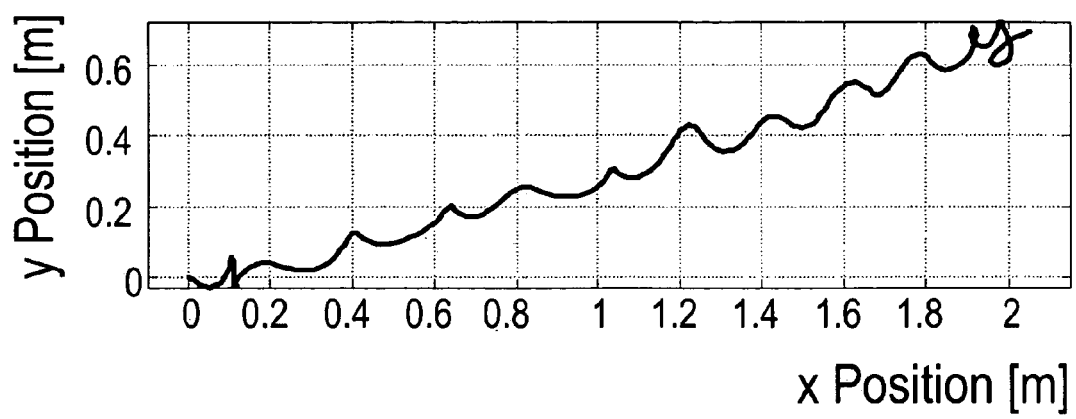
FIGS. 13A to 13F are graphs showing the results of other experiments according to the implementation of the present invention.
Figure 13B:
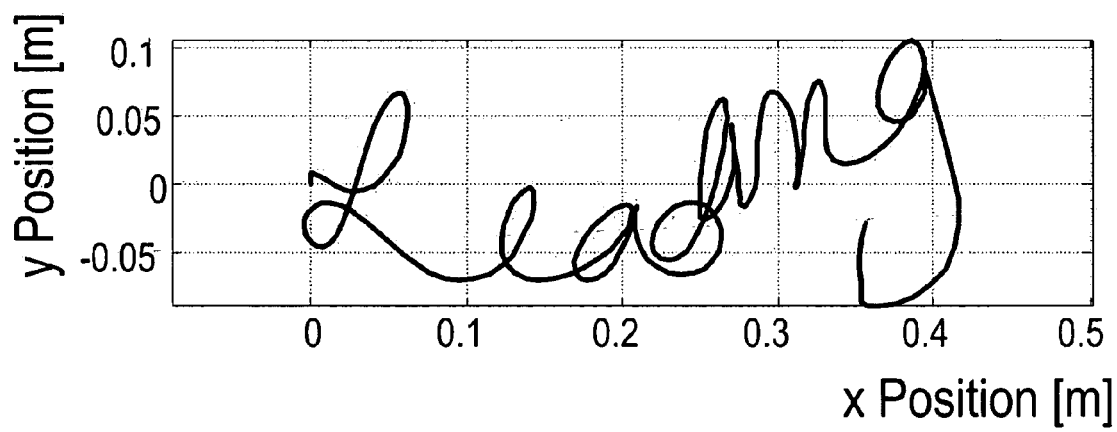
Figure 13C:
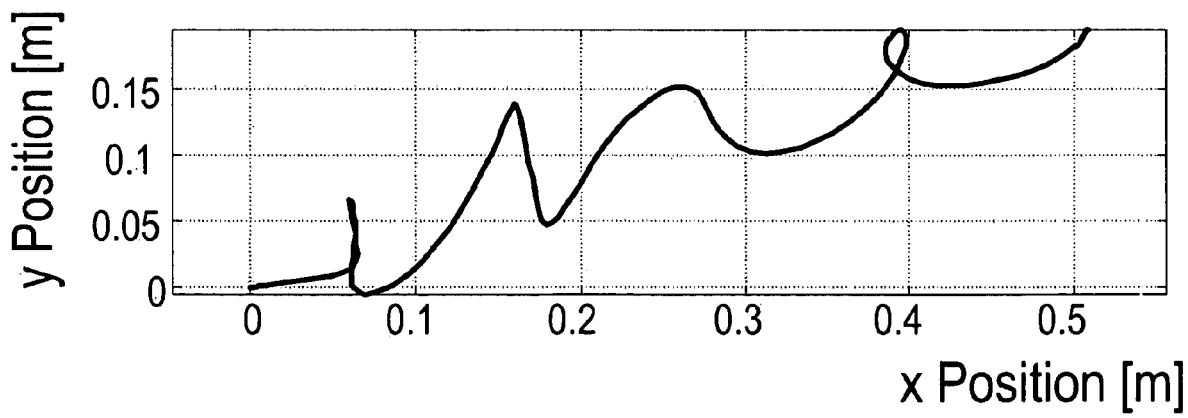
Figure 13D:
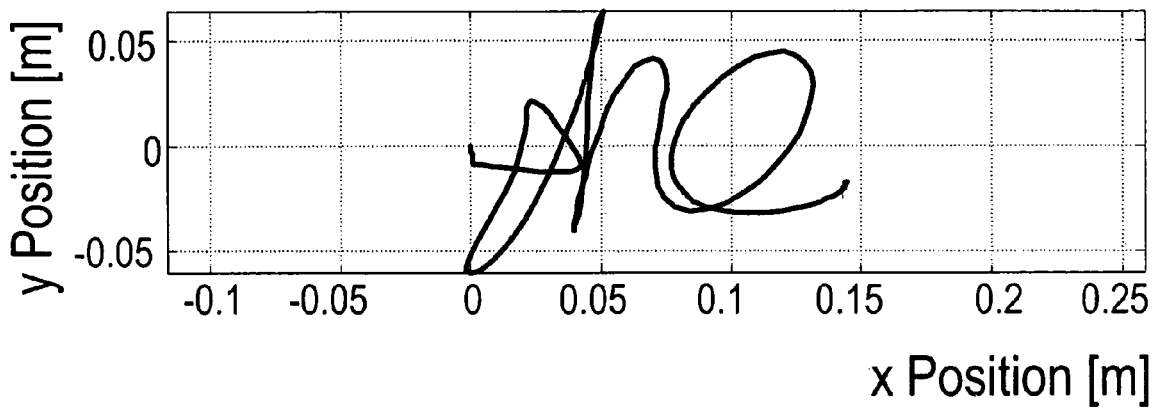
Figure 13E:
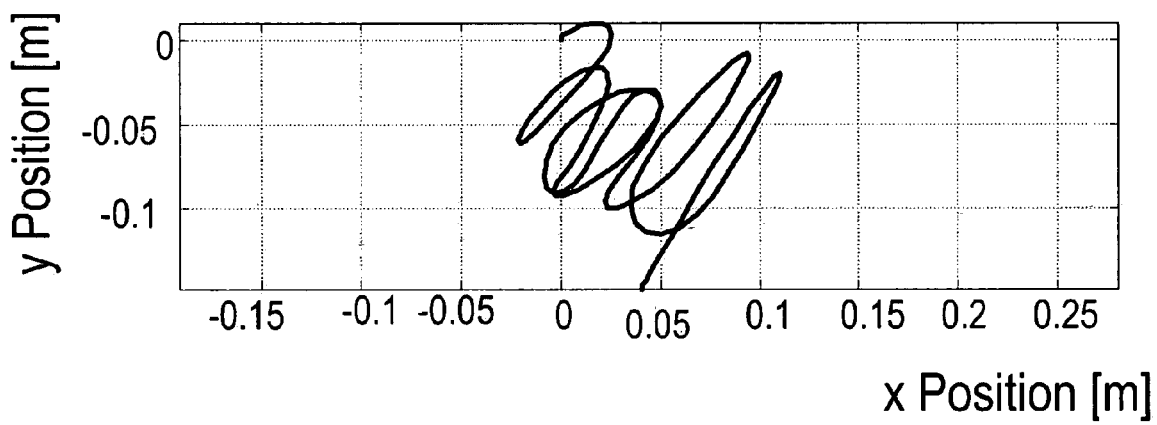
Figure 13F:
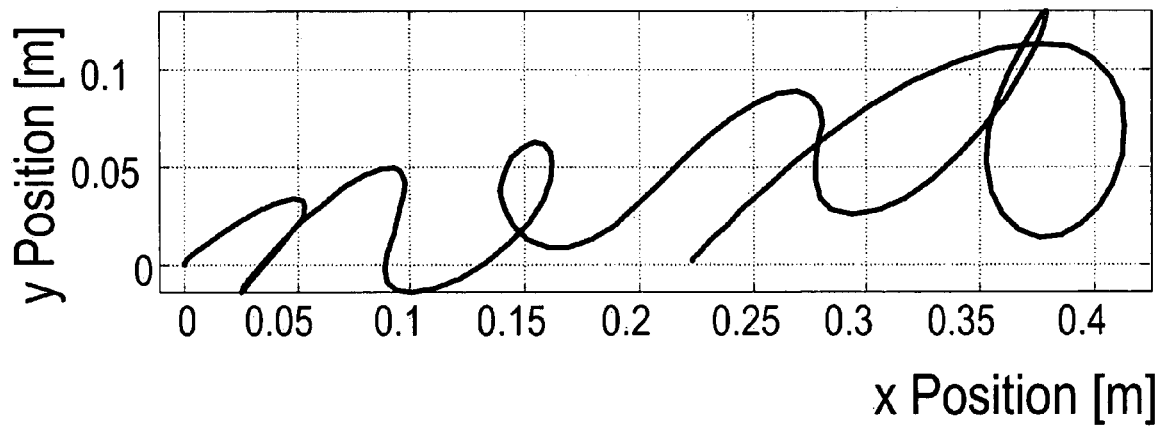

FIGS. 13A to 13F are graphs showing the results of other experiments on the tracking of the motion trajectory of an object, executed using the inertial sensor correction method according to the implementation of the present invention. The graphs in FIGS. 13A, 13C and 13E are the results of experiments based on the conventional method disclosed in U.S. Pat. No. 6,292,751, and the graphs in FIGS. 13B, 13D and 13F are the results of experiments based on the method of the present invention. In FIGS. 13A and 13B, characters spelling "Leading" are indicated. In FIGS. 13C and 13D, the characters spelling "the" are indicated. In FIGS. 13E and 13F, the characters spelling "next" are indicated. As shown in FIGS. 13A to 13F, if the present invention is used, further improved performance can be obtained at the time of tracking motion trajectory.

Figure 14:
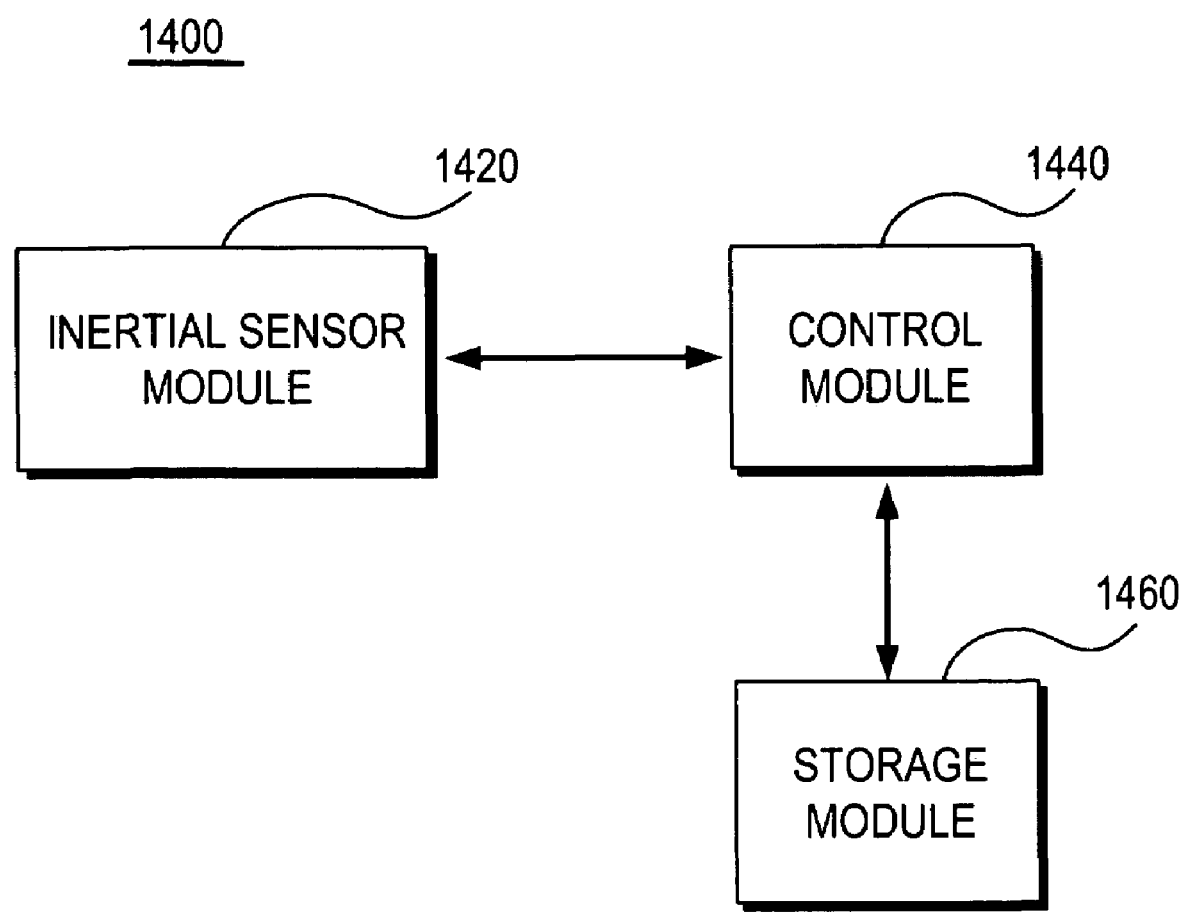
FIG. 14 is a block diagram of an apparatus for correcting an inertial sensor according to an embodiment of the present invention.

FIG. 14 is a block diagram of an apparatus for correcting an inertial sensor according to an exemplary embodiment of the present invention. The inertial sensor correction apparatus 1400 includes an inertial sensor module 1420, a control module 1440, and a storage module 1460. In this case, the inertial sensor correction apparatus 1400 can be used to track the motion trajectory of an object.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, the operations between respective modules, constituting the inertial sensor correction apparatus 1400, are described below.

The inertial sensor module 1420 measures the angular velocity and acceleration of an object that is moving in a space, and transmits the measured angular velocity and acceleration to the control module 1440. Further, the storage module 1460 stores operation methods and operation parameters required to solve the above equations. The control module 1440 functions to correct information obtained from the inertial sensor, based on the method of FIG. 8, using information about the angular velocity and acceleration, which are received from the inertial sensor module 1420, and various types of information, which is stored in the storage module 1460.

Meanwhile, the inertial sensor correction apparatus 1400 can be applied to a system that is mounted in a robot moving in a space and is adapted to track the motion trajectory of the robot, or a system that is mounted in a pen and is adapted to track the motion trajectory of the pen and to recognize arbitrary characters written by a user when the user writes the characters using the pen in a space.

Accordingly, the present invention is advantageous in that the time at which angular velocity about an arbitrary axis is "0" is sensed using an inertial sensor, and measured motion velocity is corrected at each sensed time, so that, for example, performance of the tracking of motion trajectory can be improved, thus enabling motion trajectory continuing for a long time period to be tracked.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of correcting an inertial sensor, the method comprising:
   measuring an angular velocity and an acceleration of a moving object;
   extracting zero-angular-velocity time instances at which the measured angular velocity is "0";
   calculating motion velocity from the measured acceleration; and
   correcting the calculated motion velocity for each interval between the zero-angular-velocity time instances.

2. The inertial sensor correction method according to claim 1, wherein the calculating the motion velocity comprises:
   eliminating a gravitational acceleration component from the measured acceleration to extract motion acceleration; and
   integrating the motion acceleration to calculate the motion velocity.

3. The inertial sensor correction method according to claim 2, wherein the correcting the calculated motion velocity for each interval between the zero-angular-velocity time instances comprises subtracting a predetermined linear expression for the interval between the zero-angular-velocity time instances from the calculated motion velocity.

4. The inertial sensor correction method according to claim 3, wherein the linear expression is expressed by the following equation:

$$l(t) = \frac{v(t_2) - v(t_1)}{t_2 - t_1}t + \left(v_1 - \frac{v(t_2) - v(t_1)}{t_2 - t_1}t_1\right)$$

where $t_1$ and $t_2$ denote zero-angular-velocity time instances, and $v(t_1)$ and $v(t_2)$ denote calculated motion velocities at $t_1$ and $t_2$.

5. The inertial sensor correction method according to claim 1, further comprising calculating a motion trajectory based on the corrected motion velocity.

6. The inertial sensor correction method according to claim 5, wherein the calculating the motion trajectory comprises:
 calculating motion acceleration from the corrected motion velocity; and
 calculating a position of the moving object based on the calculated motion acceleration.

7. The inertial sensor correction method according to claim 6, wherein the calculating the position of the moving object comprises performing a double integral on the calculated motion acceleration.

8. A computer-readable recording medium that records a program implementing a method of correcting an inertial sensor, the method comprising:
 measuring an angular velocity and an acceleration of a moving object;
 extracting zero-angular-velocity time instances at which the measured angular velocity is "0";
 calculating motion velocity from the measured acceleration; and
 correcting the calculated motion velocity for each interval between the zero-angular-velocity time instances.

9. An apparatus for correcting an inertial sensor, the apparatus comprising:
 an inertial sensor module which measures angular velocity and acceleration of a moving object;
 a storage module which stores predetermined operation information and parameters required to correct the measured acceleration; and
 a control module which calculates motion velocity from the measured acceleration using the operation information and the parameters, and corrects the calculated motion velocity for each interval between zero-angular-velocity time instances at which the measured angular velocity is "0".

10. The inertial sensor correction apparatus according to claim 9, wherein the control module calculates the motion velocity by eliminating a gravitational acceleration component from the measured acceleration.

11. The inertial sensor correction apparatus according to claim 10, wherein the control module corrects the calculated motion velocity by subtracting a predetermined linear expression for the interval between the zero-angular-velocity time instances from the calculated motion velocity.

12. The inertial sensor correction apparatus according to claim 11, wherein the linear expression is expressed by the following equation:

$$l(t) = \frac{v(t_2) - v(t_1)}{t_2 - t_1}t + \left(v_1 - \frac{v(t_2) - v(t_1)}{t_2 - t_1}t_1\right)$$

where $t_1$ and $t_2$ denote zero-angular-velocity time instances, and $v(t_1)$ and $v(t_2)$ denote calculated motion velocities at $t_1$ and $t_2$.

13. The inertial sensor correction apparatus according to claim 9, wherein the control module calculates a motion trajectory based on the corrected motion velocity.

14. The inertial sensor correction apparatus according to claim 13, wherein the control module calculates the motion trajectory by calculating a motion acceleration from the corrected motion velocity, and calculating a position of the moving object based on the calculated motion acceleration.

15. The inertial sensor correction apparatus according to claim 14, wherein the control module calculates the position of the moving object by performing a double integral on the calculated motion acceleration.

16. A method of calculating a motion trajectory of a moving object, comprising:
 measuring an angular velocity and an acceleration of the moving object with an inertial sensor;
 extracting zero-angular-velocity time instances at which the angular velocity of the moving object is "0";
 calculating a motion velocity of the moving object based on the acceleration of the moving object;
 correcting the motion velocity of the moving object for each time interval between the zero-angular-velocity time instances;
 calculating the motion trajectory of the moving object using the corrected motion velocity.

* * * * *